(12) United States Patent
Tanaka

(10) Patent No.: US 10,390,297 B2
(45) Date of Patent: *Aug. 20, 2019

(54) COMMUNICATION APPARATUS

(71) Applicant: BROTHER KOGYO KABUSHIKI KAISHA, Nagoya, Aichi (JP)

(72) Inventor: Satoshi Tanaka, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/190,434

(22) Filed: Nov. 14, 2018

(65) Prior Publication Data

US 2019/0082384 A1    Mar. 14, 2019

Related U.S. Application Data

(63) Continuation of application No. 15/461,843, filed on Mar. 17, 2017, now Pat. No. 10,142,925, which is a
(Continued)

(30) Foreign Application Priority Data

Dec. 26, 2012  (JP) .................................. 2012-283463

(51) Int. Cl.
*H04W 4/80* (2018.01)
*H04W 8/00* (2009.01)
(Continued)

(52) U.S. Cl.
CPC ............ *H04W 48/18* (2013.01); *H04W 4/80* (2018.02); *H04W 8/005* (2013.01); *H04W 48/08* (2013.01);
(Continued)

(58) Field of Classification Search
CPC ..... H04W 4/008; H04W 4/005; H04W 84/12; H04W 8/005; H04W 76/023
See application file for complete search history.

(56) References Cited

U.S. PATENT DOCUMENTS 7,023,979 B1    4/2006 Wu et al.
7,080,154 B1    7/2006 Inoue et al.
(Continued)

FOREIGN PATENT DOCUMENTS

CN    102511129 A    6/2012
CN    102685674 A    9/2012
(Continued)

OTHER PUBLICATIONS

Japanese Official Action dated Sep. 5, 2018 from related JP 2017-01550 together with English language translation.
(Continued)

*Primary Examiner* — Dung Hong
(74) *Attorney, Agent, or Firm* — Scully, Scott, Murphy & Presser, P.C.

(57) ABSTRACT

A first communication apparatus may receive first identification information for identifying a first wireless network and second identification information for identifying a second wireless network via a first type of interface from a second communication apparatus, in a case where the second communication apparatus currently belongs to both the first wireless network and the second wireless network. The first communication apparatus may select, from among the first and second wireless networks, by using the first and the second identification information, at least one wireless network to which the first communication apparatus currently belongs, and execute a wireless communication for target data with the second communication apparatus via a second
(Continued)

type of interface by using a target wireless network included in the selected at least one wireless network.

18 Claims, 17 Drawing Sheets

Related U.S. Application Data continuation of application No. 14/037,599, filed on Sep. 26, 2013, now Pat. No. 9,603,114.

(51) Int. Cl.

| | |
|---|---|
| *H04W 12/04* | (2009.01) |
| *H04W 48/08* | (2009.01) |
| *H04W 48/18* | (2009.01) |
| *H04W 60/00* | (2009.01) |
| *H04W 84/12* | (2009.01) |
| *H04W 88/06* | (2009.01) |

(52) U.S. Cl.
CPC ............ *H04W 60/00* (2013.01); *H04W 12/04* (2013.01); *H04W 84/12* (2013.01); *H04W 88/06* (2013.01)

(56) References Cited

U.S. PATENT DOCUMENTS

| | | | |
|---|---|---|---|
| 8,189,225 | B1 | 5/2012 | Lo et al. |
| 8,665,908 | B1 | 3/2014 | Zhang |
| 10,142,925 | B2* | 11/2018 | Tanaka .................. H04W 60/00 |
| 2004/0252715 | A1 | 12/2004 | Noda et al. |
| 2009/0036056 | A1 | 2/2009 | Oshima et al. |
| 2009/0111378 | A1 | 4/2009 | Sheynman et al. |
| 2011/0050387 | A1 | 3/2011 | Kim et al. |
| 2011/0177780 | A1 | 7/2011 | Sato et al. |
| 2011/0275316 | A1* | 11/2011 | Suumaki ............ G06K 7/10237 455/41.1 |
| 2012/0076107 | A1* | 3/2012 | Avital ..................... H04W 8/18 370/331 |
| 2012/0099566 | A1* | 4/2012 | Laine .................. H04M 1/7253 370/338 |
| 2012/0100803 | A1* | 4/2012 | Suumaki ........... H04W 36/0072 455/41.1 |
| 2012/0178367 | A1 | 7/2012 | Matsumoto et al. |
| 2012/0257245 | A1* | 10/2012 | McCoog ............... G06F 3/1204 358/1.15 |
| 2012/0265913 | A1* | 10/2012 | Suumaki ................. H04W 4/08 710/303 |
| 2013/0036231 | A1* | 2/2013 | Suumaki ............... H04W 12/04 709/228 |
| 2013/0100928 | A1* | 4/2013 | Matsumori ........... H04W 36/24 370/331 |
| 2013/0137373 | A1* | 5/2013 | Choi ..................... H04B 5/0031 455/41.1 |
| 2013/0215467 | A1 | 8/2013 | Fein et al. |
| 2013/0258402 | A1 | 10/2013 | Arai |
| 2013/0260683 | A1* | 10/2013 | Suzuki .................. H04W 76/10 455/41.1 |
| 2013/0309968 | A1 | 11/2013 | Suzuki |
| 2013/0309971 | A1* | 11/2013 | Kiukkonen ........... H04L 63/107 455/41.2 |
| 2014/0004793 | A1* | 1/2014 | Bandyopadhyay ......................... H04L 63/0428 455/41.1 |
| 2014/0091987 | A1* | 4/2014 | Lee ........................ H04L 65/00 345/2.3 |
| 2014/0092885 | A1* | 4/2014 | Venkatachalam ..... H04W 76/14 370/338 |
| 2014/0176981 | A1 | 6/2014 | Asai |
| 2015/0304805 | A1 | 10/2015 | Suzuki et al. |
| 2016/0011830 | A1 | 1/2016 | Asakura |
| 2016/0157230 | A1 | 6/2016 | Nord et al. |
| 2017/0208431 | A1 | 7/2017 | Suzuki et al. |

FOREIGN PATENT DOCUMENTS

| | | |
|---|---|---|
| CN | 103369171 A | 10/2013 |
| CN | 103369637 A | 10/2013 |
| JP | 2003-198568 A | 7/2003 |
| JP | 2007-166538 A | 6/2007 |
| JP | 2011-146991 A | 7/2011 |
| JP | 2012-134932 A | 7/2012 |
| JP | 2013-214804 A | 10/2013 |
| JP | 2014-093567 A | 5/2014 |
| WO | 2010/008251 A2 | 1/2010 |
| WO | 2012/011289 A1 | 1/2012 |
| WO | 2013052641 A2 | 4/2013 |

OTHER PUBLICATIONS

Notification of First Office Action dated Mar. 28, 2018 received from the Chinese Patent Office in related application 201410836694 together with English language translation.
U.S. Office Action dated Feb. 23, 2018 from related U.S. Appl. No. 15/714,321.
Extended European Search Report dated Jun. 6, 2014 from related European Application No. 13 18 5998.5.
Office Action dated Jul. 16, 2015 in related U.S. Appl. No. 14/037,599.
Office Action dated Jan. 21, 2016 in related U.S. Appl. No. 14/037,599.
Notice of Allowance dated Oct. 27, 2016 from related U.S. Appl. No. 14/037,599.
"Understanding the Newtork Terms SSID, BSSID, and ESSID", Juniper Networks, Oct. 15, 2013.
Official Action dated Oct. 10, 2016 received from the Chinese Patent Office in related CN201310451519.7 together with English language translation.
Extended European Search Report dated Jul. 28, 2015 from related EP 14200176.7 from related U.S. Appl. No. 14/580,473.
Ex parte Quayle Office Action dated Nov. 4, 2015 from related U.S. Appl. No. 14/580,473.
Notice of Allowance dated Jan. 25, 2016 from related U.S. Appl. No. 14/580,473.
European Office Action dated May 20, 2016 from related EP 14 200 176.7.
Japanese Office Action dated Feb. 7, 2017 from related JP 2013271752.
U.S. Appl. No. 15/153,523, filed May 12, 2016.
U.S. Office Action dated Jul. 27, 2016 from related U.S. Appl. No. 15/153,523.
Notice of Allowance dated Dec. 9, 2016 from related U.S. Appl. No. 15/153,523.
U.S. Office Action dated Sep. 22, 2017 from related U.S. Appl. No. 15/461,843.
Notice of Allowance dated Jul. 16, 2018 from related U.S. Appl. No. 15/461,843.
Notice of Allowance dated Mar. 13, 2018 from related U.S. Appl. No. 15/461,843.
U.S. Office Action dated Jan. 25, 2019 from related U.S. Appl. No. 16/205,324.

\* cited by examiner (First Embodiment)

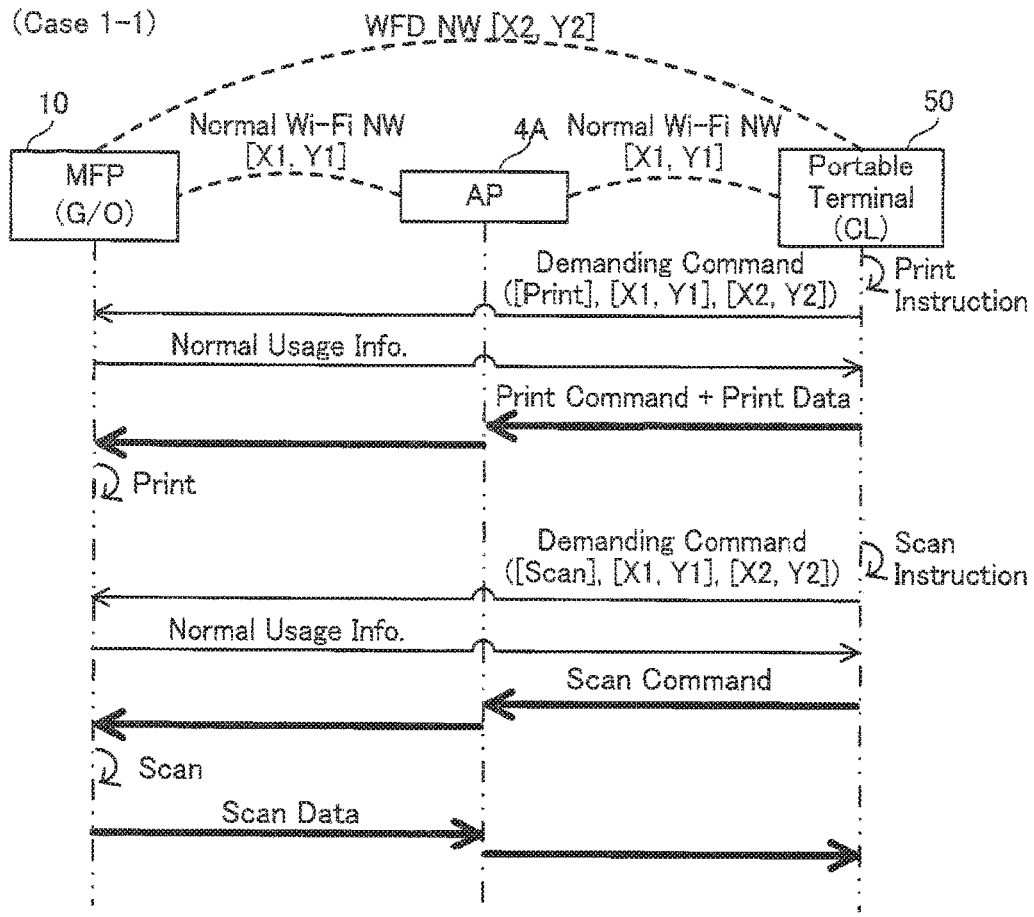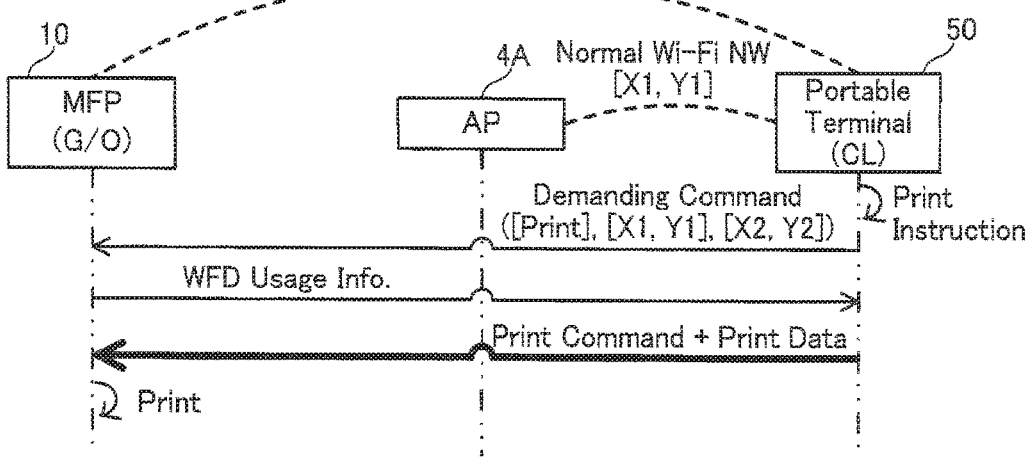
FIG. 5

FIG. 6
(Case 1-3)
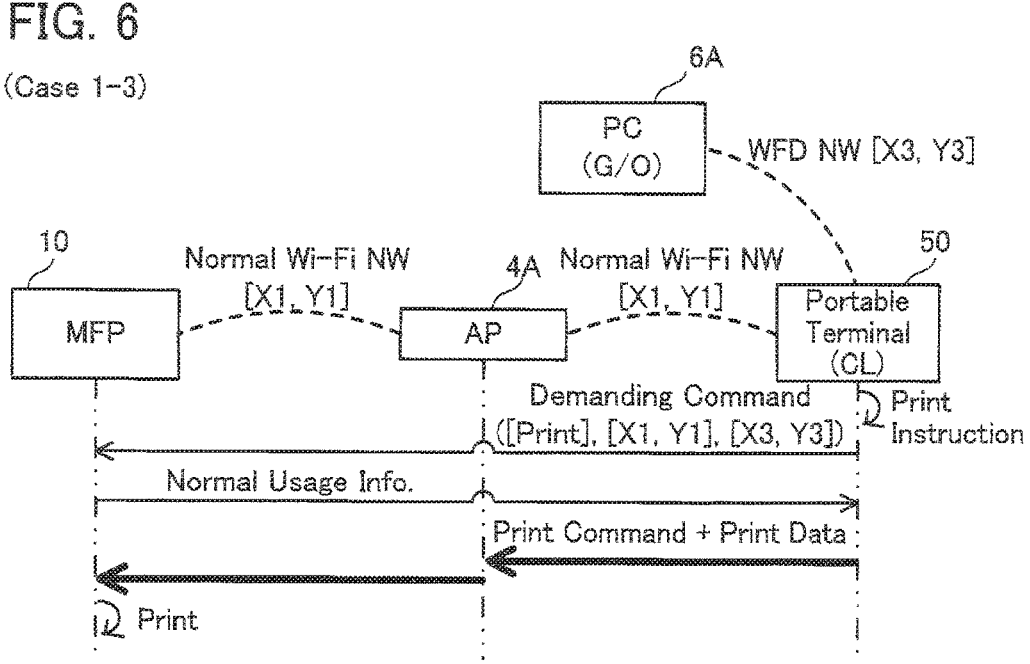
(Case 1-4)
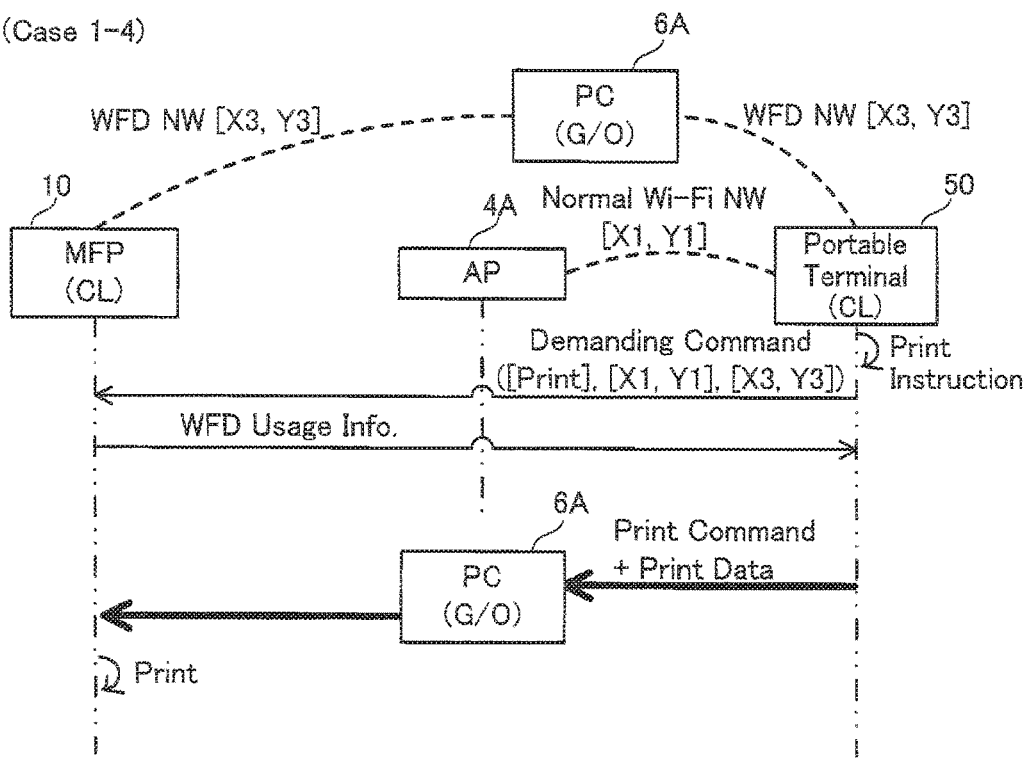

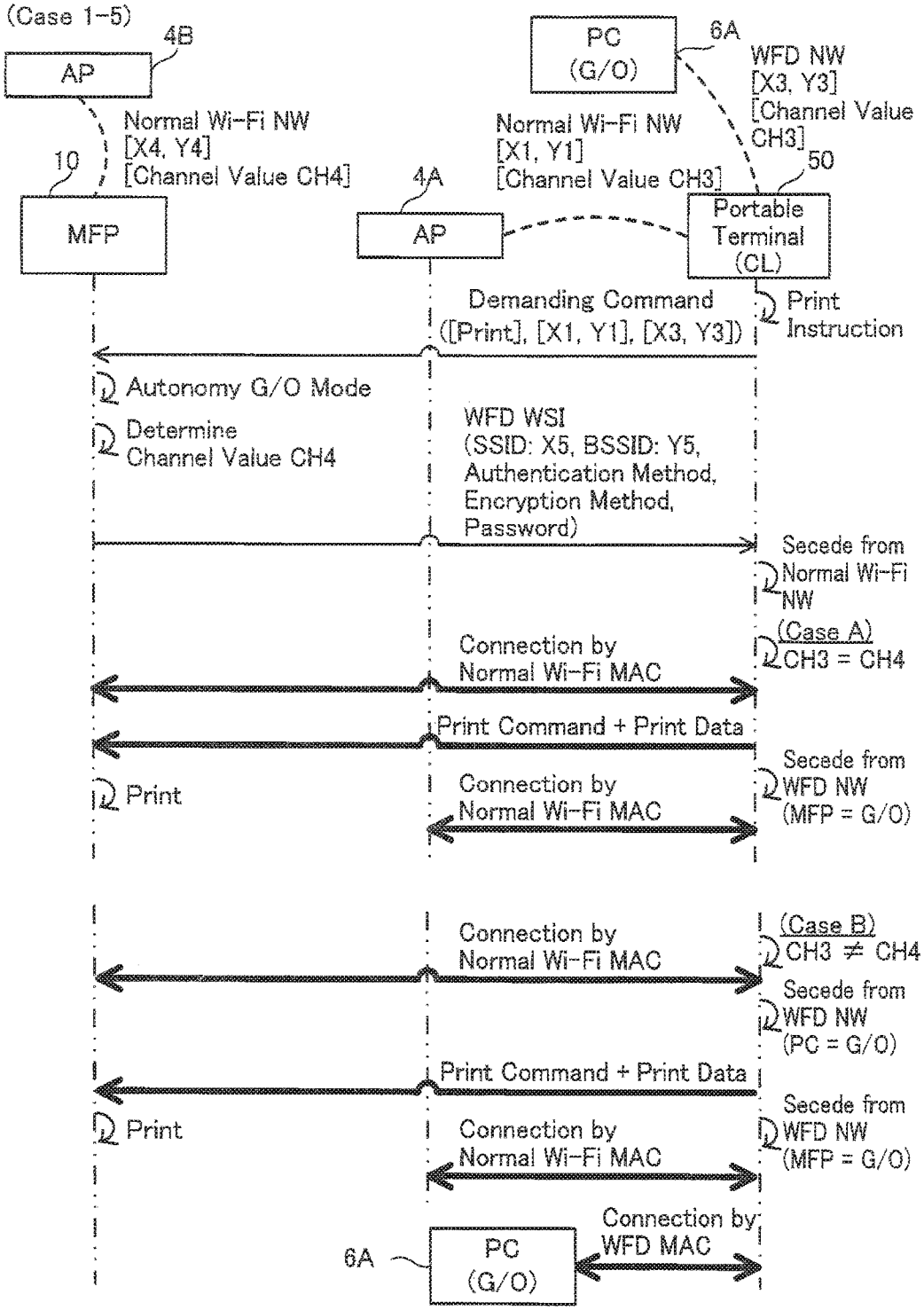

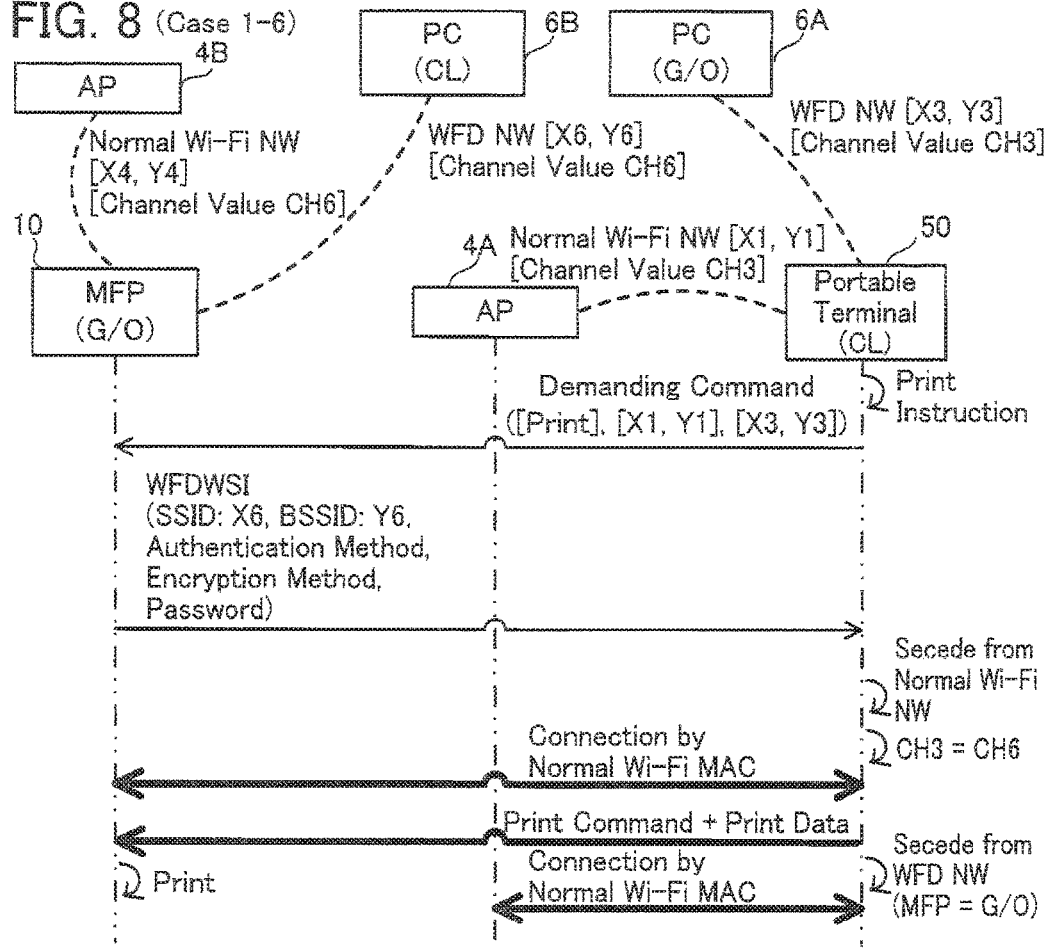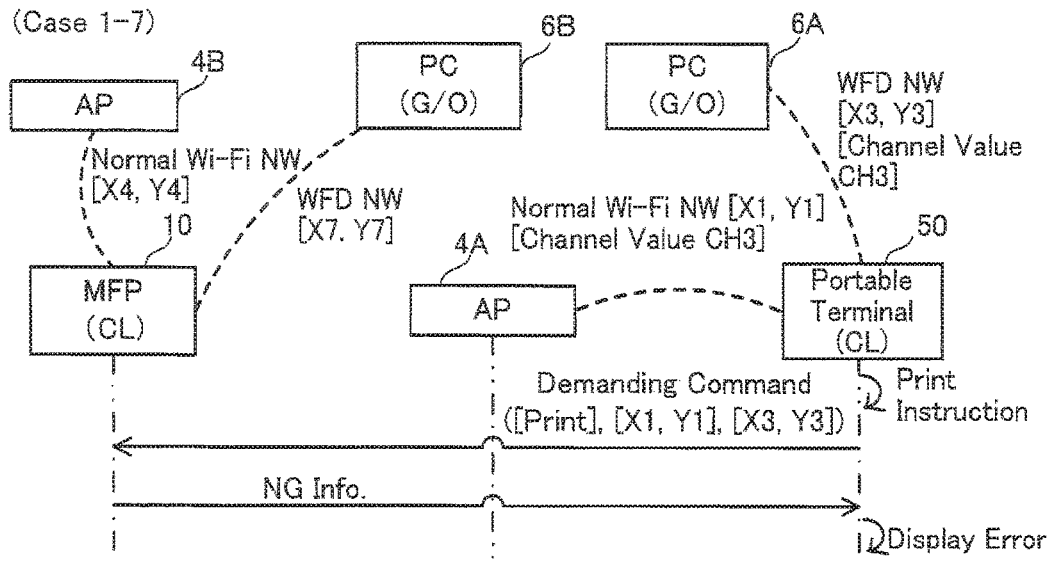

(Second Embodiment)

FIG. 13 (Fourth Embodiment)

FIG. 14
(Case 4-1)
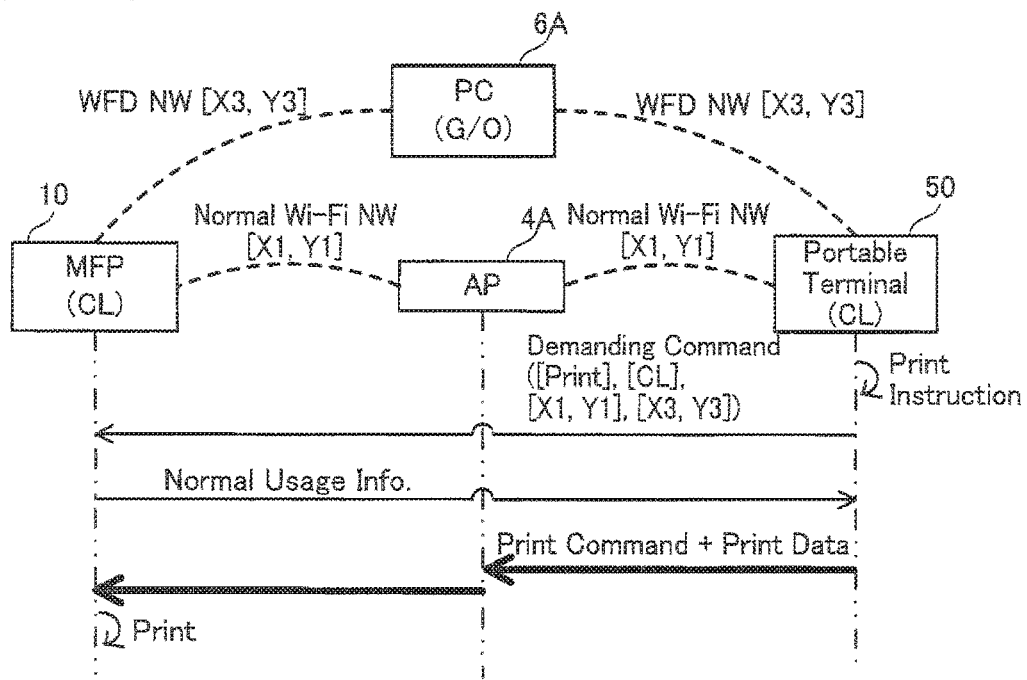
(Case 4-2)
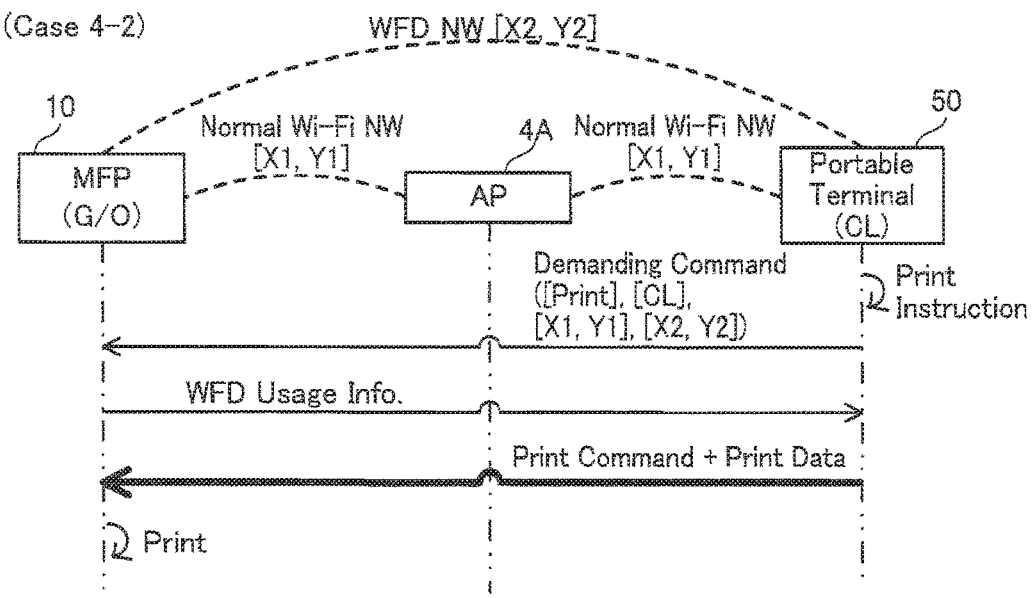

(Fifth Embodiment)

(Fifth Embodiment)

FIG. 17
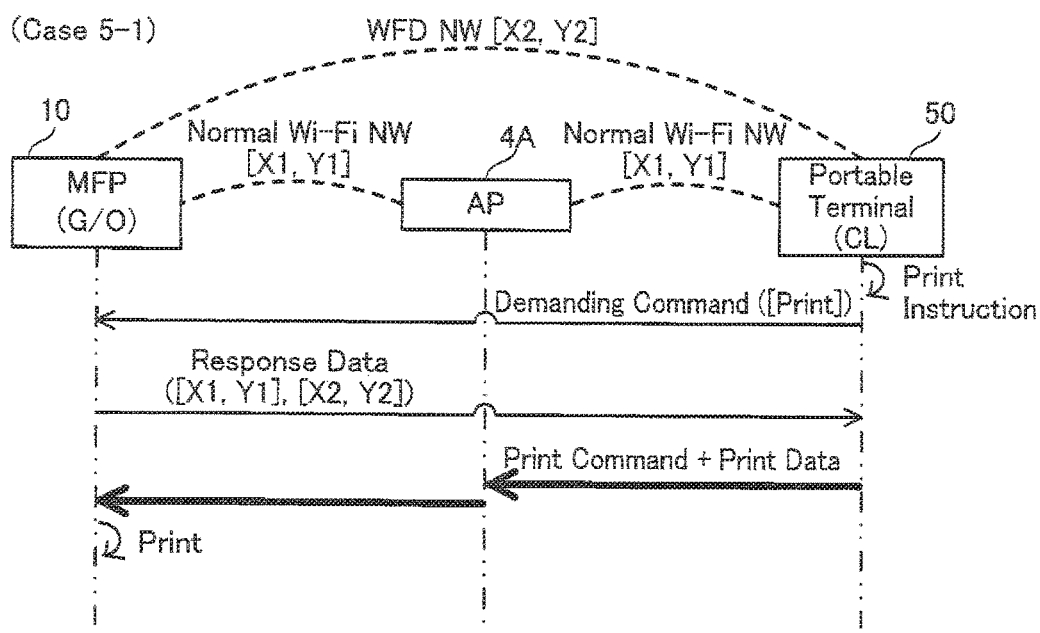
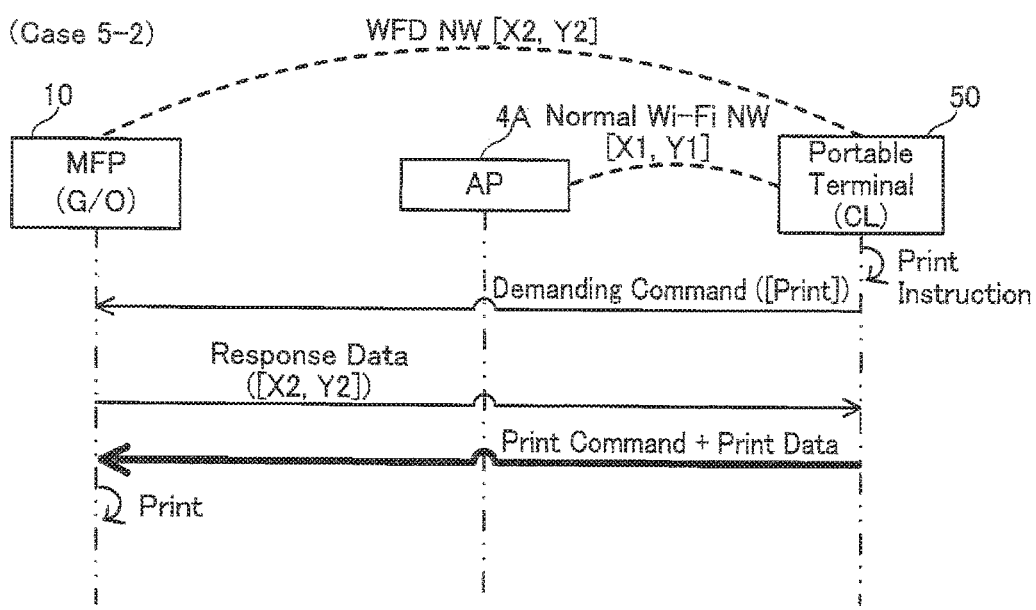

COMMUNICATION APPARATUS

CROSS-REFERENCE TO RELATED APPLICATIONS

This application is a continuation application of U.S. patent application Ser. No. 15/461,843 filed on Mar. 17, 2017 which is a continuation application of U.S. patent application Ser. No. 14/037,599 filed on Sep. 26, 2013, now U.S. Pat. No. 9,603,114 issued on Mar. 21, 2017 and claims priority to Japanese Patent Application No. 2012-283463, filed on Dec. 26, 2012, the contents of each of which are hereby incorporated by reference into the present application.

TECHNICAL FIELD

A communication apparatus for executing a wireless communication for target data is disclosed in the present specification.

DESCRIPTION OF RELATED ART

In a known technique, when a mobile phone establishes an NFC communication with a counterpart apparatus, the mobile phone determines whether or not a power state of Bluetooth (registered trademark) of the mobile phone is ON. In case the power state of Bluetooth is ON, the mobile phone sends a request for Bluetooth to be a handover destination to the counterpart apparatus by using the NFC communication. In this case, the mobile phone executes a wireless communication with the counterpart apparatus by using Bluetooth. In case the power state of Bluetooth is not ON, the mobile phone sends a request for a communication means (Bluetooth or wireless LAN) selected by a user to be a handover destination to the counterpart apparatus by using the NFC communication. In this case, the mobile phone executes a wireless communication with the counterpart apparatus by using the communication means selected by the user.

SUMMARY

In the above technique, a situation in which the counterpart apparatus belongs to a plurality of wireless networks is not disclosed at all. In the present specification, a technique is disclosed that, a first communication apparatus and a second communication apparatus may appropriately execute a wireless communication for target data, in a case where a second communication apparatus belongs to a plurality of wireless networks.

One aspect disclosed in the present specification may be a first communication apparatus. The first communication apparatus may comprise: a first type of interface for executing a wireless communication with a second communication apparatus; a second type of interface for executing a wireless communication with the second communication apparatus; and a controller. The controller may be configured to perform: receiving first identification information for identifying a first wireless network and second identification information for identifying a second wireless network via the first type of interface from the second communication apparatus, in a case where the second communication apparatus currently belongs to both the first wireless network and the second wireless network; selecting, from among the first wireless network and the second wireless network, by using the first identification information and the second identification information, at least one wireless network to which the first communication apparatus currently belongs; and executing a wireless communication for target data with the second communication apparatus via the second type of interface by using a target wireless network included in the selected at least one wireless network.

One aspect disclosed in the present specification may be a second communication apparatus. The second communication apparatus may comprise: a first type of interface for executing a wireless communication with a first communication apparatus; a second type of interface for executing a wireless communication with the first communication apparatus; and a controller. The controller may be configured to perform: sending first identification information for identifying a first wireless network and second identification information for identifying a second wireless network via the first type of interface to the first communication apparatus, in a case where the second communication apparatus currently belongs to both the first wireless network and the second wireless network, the first identification information and the second identification information being used by the first communication apparatus to select, from among the first wireless network and the second wireless network, at least one wireless network to which the first communication apparatus currently belongs; and executing a wireless communication for target data with the first communication apparatus via the second type of interface by using a target wireless network included in the selected at least one wireless network.

A control method, a computer program, and computer-readable instructions for realizing the first and/or the second communication apparatus, and a non-transitory computer-readable medium that stores the computer program or the computer-readable instructions, are also novel and useful. Further, a communication system comprising the first and the second communication apparatuses is also novel and useful.

BRIEF DESCRIPTION OF THE DRAWINGS

FIG. 5 shows a sequence diagram of case 1-1 and case 1-2.

FIG. 6 shows a sequence diagram of case 1-3 and case 1-4.

FIG. 7 shows a sequence diagram of case 1-5.

FIG. 8 shows a sequence diagram of case 1-6 and case 1-7.

FIG. 14 shows a sequence diagram of case 4-1 and case 4-2.

FIG. 17 shows a sequence diagram of case 5-1 and case 5-2.

EMBODIMENT

First Embodiment (Configuration of Communication System 2)

Figure 1:
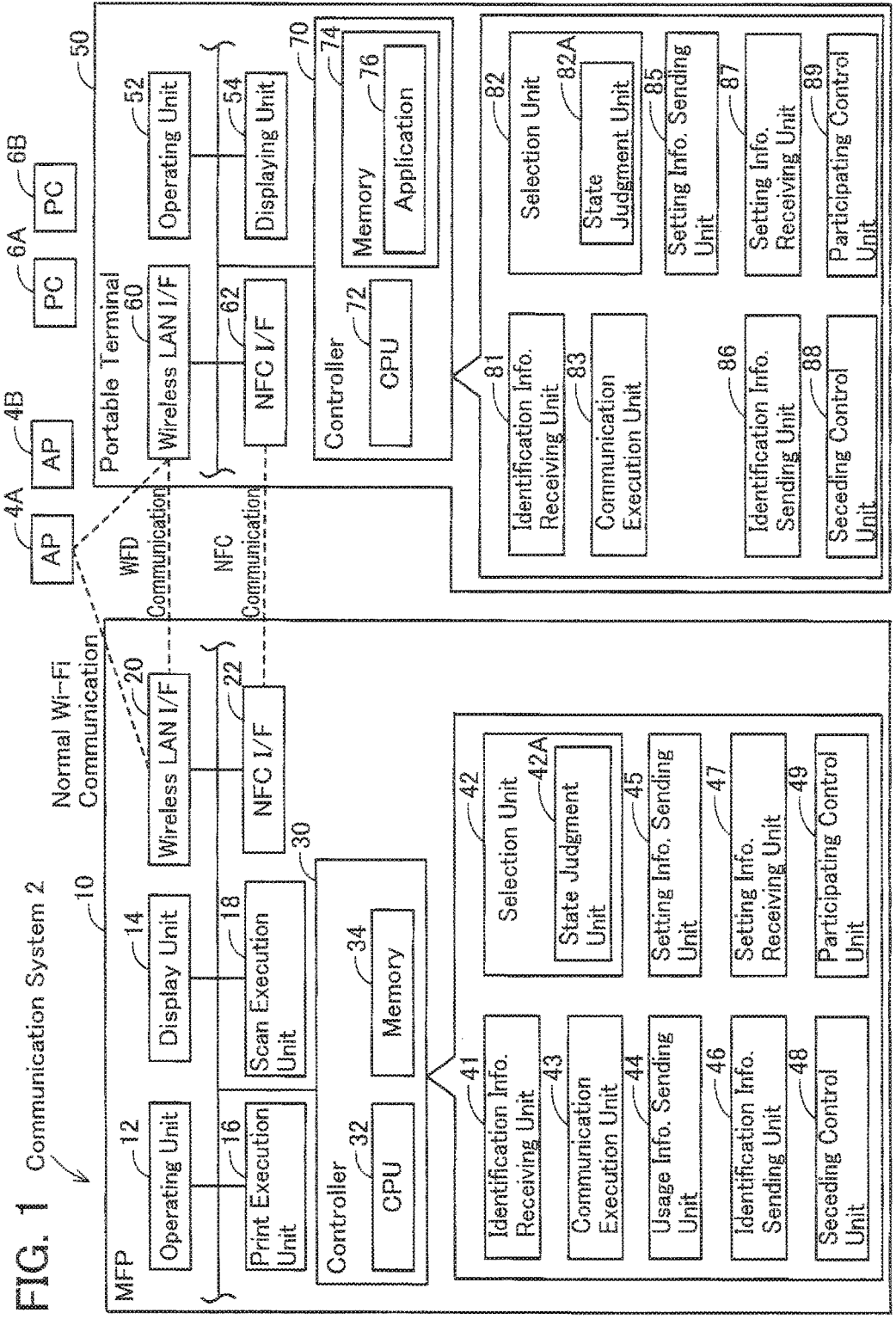
FIG. 1 shows the configuration of a communication system.

As shown in FIG. 1, a communication system 2 comprises a plurality of access points (called "AP (an abbreviation of Access Point)" below) 4A, 4B, a plurality of PCs (an abbreviation of Personal Computer) 6A, 6B, a multi-function peripheral (called "MFP (an abbreviation of Multi-Function Peripheral)" below) 10, and a portable terminal 50.

(Configuration of MFP 10)

The MFP 10 is a peripheral apparatus capable of executing multiple functions including a print function and a scan function. The MFP 10 comprises an operating unit 12, a display unit 14, a print execution unit 16, a scan execution unit 18, a wireless LAN (an abbreviation of Local Area Network) interface 20, an NFC (an abbreviation of Near Field Communication) interface 22, and a controller 30. The units 12 to 30 are connected to a bus line (reference number omitted). Below, interface is referred to as "I/F".

The operating unit 12 comprises a plurality of keys. A user can give various instructions to the MFP 10 by operating the operating unit 12. The display unit 14 is a display for showing various information. The print execution unit 16 is an ink jet method, laser method, etc. printing mechanism. The scan execution unit 18 is a CCD, CIS, etc. scanning mechanism.

The wireless LAN I/F 20 is an interface for executing a wireless communication, and is physically one interface (i.e., one IC chip). However, a MAC address (called "WFD MAC" below) used in wireless communication (called "WFD communication" below) according to a WFD (an abbreviation of Wi-Fi Direct) method, and a MAC address (called "normal Wi-Fi MAC" below) used in wireless communication (called "normal Wi-Fi communication" below) according to a normal Wi-Fi method are both assigned to the wireless LAN I/F 20.

Specifically, the normal Wi-Fi MAC is assigned in advance to the wireless LAN I/F 20. By using the normal Wi-Fi MAC, the controller 30 creates the WFD MAC which is different from the normal Wi-Fi MAC, and assigns the WFD MAC to the wireless LAN I/F 20. Consequently, the controller 30 can simultaneously execute both a normal Wi-Fi communication using the normal Wi-Fi MAC, and a WFD communication using the WFD MAC. The WFD communication and the normal Wi-Fi communication will be described in detail later.

The NFC I/F 22 is an interface for executing NFC communication. NFC communication is a wireless communication according to an NFC system for so-called short distance wireless communication. The NFC system is a wireless communication system based on e.g., international standards ISO/IEC21481 or 18092. A chip configuring the NFC I/F 22, and a chip configuring the wireless LAN I/F 20 are physically different.

A communication speed of a wireless communication using the wireless LAN I/F 20 (e.g., maximum communication speed is 11 to 600 Mbps) is faster than a communication speed of a wireless communication using the NFC I/F 22 (e.g., maximum communication speed is 100 to 424 Kbps). Further, frequency of a carrier wave in a wireless communication using the wireless LAN I/F 20 (e.g., 2.4 GHz band, 5.0 GHz band) differs from frequency of a carrier wave in a wireless communication using the NFC I/F 22 (e.g., 13.56 MHz band). Further, in case e.g., distance between the MFP 10 and the portable terminal 50 is less than or equal to approximately 10 cm, the controller 30 can execute an NFC communication with the portable terminal 50 by using the NFC I/F 22. On the other hand, in both a case where distance between the MFP 10 and the portable terminal 50 is less than or equal to 10 cm, or a case where the distance is greater than or equal to 10 cm (e.g., at a maximum is approximately 100 m), the controller 30 can execute a WFD communication and a normal Wi-Fi communication with the portable terminal 50 by using the wireless LAN I/F 20. That is, a maximum distance across which the MFP 10 can execute a wireless communication with a communication destination apparatus (e.g., the portable terminal 50) by using the wireless LAN I/F 20 is greater than a maximum distance across which the MFP 10 can execute a wireless communication with the communication destination apparatus by using the NFC I/F 22.

The controller 30 comprises a CPU 32 and a memory 34. The CPU 32 executes various processes according to a program stored in the memory 34. The CPU 32 realizes the functions of units 41 to 49 by executing processes according to the program. Moreover, units 42A, 46 to 49 are units which function in a fourth or fifth embodiment (to be described), and consequently may be omitted in the present embodiment.

(Configuration of Portable Terminal 50)

The portable terminal 50 is a portable terminal device such as a mobile phone (e.g., a Smart Phone), PDA, notebook PC, tablet PC, portable music playback device, portable video playback device, etc. The portable terminal 50 comprises an operating unit 52, a displaying unit 54, a wireless LAN I/F 60, an NFC I/F 62 and a controller 70. The units 52 to 70 are connected to a bus line (reference number omitted).

The operating unit 52 comprises a plurality of keys. The user can give various instructions to the portable terminal 50 by operating the operating unit 52. The displaying unit 54 is a display for displaying various information.

The wireless LAN I/F 60 and the NFC I/F 62 are respectively similar to the wireless LAN I/F 20 and the NFC I/F 22 of the MFP 10. That is, both a WFD MAC and a normal Wi-Fi MAC are assigned to the wireless LAN I/F 60. Consequently, the controller 70 may simultaneously execute both a normal Wi-Fi communication using the normal Wi-Fi MAC, and a WFD communication using the WFD MAC. Moreover, the WFD MAC and the normal Wi-Fi MAC of the portable terminal 50 are respectively different from the WFD MAC and the normal Wi-Fi MAC of the MFP 10. Further, mutually differing points of the wireless LAN I/F 60 and the NFC I/F 62 are similar to mutually differing points of the wireless LAN I/F 20 and the NFC OF 22. For example, a communication speed of a wireless communication using the wireless LAN I/F 60 is faster than a communication speed of a wireless communication using the NFC I/F 62.

The controller 70 comprises a CPU 72 and a memory 74. The CPU 72 executes various processes according to a program stored in the memory 74. The CPU 72 realizes the functions of units 81 to 89 by executing processes according to the program. Moreover, the units 81, 82, 85 are units which function in the fifth embodiment (to be described), and consequently may be omitted in the present embodiment.

The memory 74 stores an application 76 for causing the MFP 10 to execute a function (e.g., print function, scan function, etc.). The application 76 may, e.g., be installed on the portable terminal 50 from a server provided by a vendor of the MFP 10, or may be installed on the portable terminal 50 from a media shipped together with the MFP 10.

(Other Apparatuses 4A, 4B, 6A, 6B)

The APs 4A, 4B are each a standard access point called a wireless access point, wireless LAN router, etc., and are different from a so-called Soft AP of a WFD method G/O apparatus (to be described) or of the normal Wi-Fi method. The APs 4A, 4B can form a wireless network according to the normal Wi-Fi method. Further, the PCs 6A, 6B are each a known computer that operates according to an OS program. The PCs 6A, 6B can execute a WFD communication according to the WFD method.

(WFD and Normal Wi-Fi)

Next, WFD communication according to the WFD method and normal Wi-Fi communication according to the normal Wi-Fi method will be described in detail. As described above, in terms of the MAC address used by the MFP 10 or the portable terminal 50, the WFD communication and the WFD method are respectively a wireless communication and wireless communication system in which the WFD MAC is used. Further, the normal Wi-Fi communication and the normal Wi-Fi method are respectively a wireless communication and wireless communication system in which the normal Wi-Fi MAC is used.

(WFD)

The WFD method is a wireless communication system described in the standard document "Wi-Fi Peer-to-Peer (P2P) Technical Specification Version 1.1", created by Wi-Fi Alliance. The WFD method is a wireless communication system for executing wireless communication in accordance with, e.g., IEEE (an abbreviation of The Institute of Electrical and Electronics Engineers, Inc.) standard 802.11 and standards conforming thereto (e.g., 802.11a, 11b, 11g, 11n, etc.).

Below, an apparatus capable of executing a WFD communication according to the WFD method, such as the MFP 10, the portable terminal 50, etc. is called a "WFD-compatible apparatus". In the WFD standard document, three states are defined as the states of the WFD-compatible apparatus: Group Owner state (called "G/O state" below), client state (called "CL state" below), and device state. The WFD-compatible apparatus is capable of selectively operating in one state among the three states.

When a pair of WFD-compatible apparatuses that are in the device state are to newly form a wireless network, the pair of WFD-compatible apparatuses usually execute a wireless communication called G/O negotiation. In the G/O negotiation, it is determined that one of the pair of WFD-compatible apparatuses will assume the G/O state (i.e., become a G/O apparatus), and that the other of the pair of WFD-compatible apparatuses will assume the CL state (i.e., become a CL apparatus). Then the pair of WFD-compatible apparatuses establishes a connection and forms the wireless network.

Below, a wireless network formed according to a procedure (e.g., G/O negotiation) of the WFD method is called a "WFD NW". At a stage of newly forming the WFD NW by means of G/O negotiation, only one G/O apparatus and one CL apparatus belong to the WFD NW. However, the G/O apparatus can establish a connection with another apparatus, and cause the other apparatus to newly participate in the WFD NW as a CL apparatus. In this case, a state is formed in which two or more CL apparatuses belong to the WFD NW. That is, one G/O apparatus and one or more CL apparatuses may be present in the WFD NW. The G/O apparatus manages the one or more CL apparatuses. Specifically, the G/O apparatus registers the MAC address of each of the one or more CL apparatuses in a management list in the memory of the G/O apparatus. Further, when the CL apparatus secedes from the WFD NW, the G/O apparatus deletes the MAC address of the CL apparatus from the management list. Moreover, when a number of CL apparatuses becomes zero (i.e., a number of MAC addresses registered in the management list becomes zero), the G/O apparatus usually shifts from the G/O state to the device state, and dissolves the WFD NW.

An upper value for the number of CL apparatuses that can be managed by the G/O apparatus (i.e., an upper value for the number of MAC addresses of CL apparatuses that can be registered in the management list) is determined in advance by the G/O apparatus. In the present embodiment, the upper value for the number of CL apparatuses that can be managed by the G/O apparatus is an integer of two or more. However, in a variant, one may be the upper value for the number of CL apparatuses that can be managed by the G/O apparatus. That is, the upper value for the number of CL apparatuses that can be managed by the G/O apparatus may be an integer of one or more.

The G/O apparatus can execute a wireless communication for target data with a CL apparatus registered in the management list without going via another device. The target data is data that includes network layer information of the OSI reference model, and information of a layer higher than the network layer (e.g., application layer), e.g., that includes print data, scan data, etc. Further, the G/O apparatus is capable of relaying a wireless communication for the target data between a plurality of CL apparatuses. In other words, a pair of CL apparatuses can execute a wireless communication for the target data via the G/O apparatus.

As described above, in the WFD NW, a wireless communication for the target data can be executed between a WFD-compatible apparatus that is a sending source of the target data and a WFD-compatible apparatus that is a sending destination of the target data without passing via an AP (e.g., the APs 4A, 4B) configured separately from these WFD-compatible apparatuses. That is, it can be said that the WFD communication and the WFD method are respectively a wireless communication not via an AP and a wireless communication system not using an AP.

Moreover, differences between the WFD G/O apparatus and the AP (e.g., the APs 4A, 4B) are as follows. That is, in case the WFD G/O apparatus secedes from the WFD NW to which this apparatus belongs, and newly belongs to another WFD NW, the WFD G/O apparatus may operate in a state (i.e., CL state) different from the G/O state. By contrast, the AP can only execute the same operation as the G/O state of WFD (e.g., relay wireless communication), and cannot execute the same operation as the CL state of WFD.

The G/O apparatus cannot execute a wireless communication for the target data with a WFD-compatible apparatus in the device state (i.e., a device apparatus), but can execute a wireless communication, with a device apparatus, of data for connecting with the WFD method. That is, by executing a wireless communication with the device apparatus of data for connecting with the WFD method, the G/O apparatus can establish a connection with the device apparatus, and cause the device apparatus to participate in the WFD NW. In other words, by executing a wireless communication, with the G/O apparatus, of the data for connecting with the WFD method, the device apparatus can establish a connection with the G/O apparatus and can participate in the WFD NW. In this case, the device apparatus shifts from the device state to the CL state. The data for connecting with the WFD method is data including information of a layer lower than the network layer of the OSI reference model (e.g., physical layer, data link layer) (i.e., data not including network layer information), e.g., including a Probe Request signal, Probe Response signal, Provision Discovery Request signal, Provision Discovery Response signal, Association Request signal, Association Response signal, Authentication Request signal, Authentication Response signal, 4-Way Handshake signal, etc.

Further, by executing a wireless communication, with the normal Wi-Fi apparatus, of data for connecting with the normal Wi-Fi method, the G/O apparatus can establish a connection with the normal Wi-Fi apparatus, and cause the normal Wi-Fi apparatus to participate in the WFD NW. The normal Wi-Fi apparatus is an apparatus which cannot belong to a wireless network according to the WFD method (i.e., cannot execute a G/O negotiation), but can belong to a wireless network according to the normal Wi-Fi method. The normal Wi-Fi apparatus is also called a "legacy apparatus". Except for the point that the data for connecting with the normal Wi-Fi method does not include the Provision Discovery Request signal and the Provision Discovery Response signal, the data for connecting with the normal Wi-Fi method is the same as the data for connecting with the WFD method. In case of establishing a connection with a normal Wi-Fi apparatus, the G/O apparatus describes a MAC address of the normal Wi-Fi apparatus in the management list. Thereby, the normal Wi-Fi apparatus can participate in the WFD NW. The normal Wi-Fi apparatus is not capable of selectively operating in any state of the three states (i.e., G/O state, CL state, device state), but operates in a state similar to a CL apparatus while belonging to the WFD NW.

As described above, the G/O apparatus can establish a connection with a WFD-compatible apparatus (i.e., a device apparatus) or a normal Wi-Fi apparatus, and cause the WFD-compatible apparatus or normal Wi-Fi apparatus to newly participate in the WFD NW. However, unlike the G/O apparatus, the CL apparatus cannot establish a connection with a WFD-compatible apparatus or a normal Wi-Fi apparatus and cause the WFD-compatible apparatus or normal Wi-Fi apparatus to newly participate in the WFD NW.

(Normal Wi-Fi)

The normal Wi-Fi method is a wireless communication system defined by Wi-Fi Alliance, and is a wireless communication system different from the WFD method. As with the WFD method, the normal Wi-Fi method is a wireless communication system for executing a wireless communication according to IEEE standard 802.11 and standards conforming thereto (e.g., 802.11a, 11b, 11g, 11n, etc.). That is, in terms of communication standard, the WFD method and the normal Wi-Fi method are the same.

However, as described above, the WFD method is a wireless communication system for executing a wireless communication not via an AP, whereas the normal Wi-Fi method is a wireless communication system for executing a wireless communication via an AP. Further, the WFD method is a wireless communication system having a G/O negotiation scheme, whereas the normal Wi-Fi method is a wireless communication system not having that scheme. Further, as described above, the data for connecting with the WFD method includes the Provision Discovery Request signal and the Provision Discovery Response signal, whereas the data for connecting with the normal Wi-Fi method does not include these signals. Further, the WFD method is a wireless communication system allowing selective operation in any state of three states (i.e., G/O state, CL state, device state), whereas the normal Wi-Fi method is a wireless communication system not allowing this type of selective operation. The WFD method and the normal Wi-Fi method differ in these points.

The normal Wi-Fi apparatus establishes a connection with an AP by executing, with an AP (e.g., the AP 4A), a wireless communication of the data for connecting with the normal Wi-Fi method. Thereby, the normal Wi-Fi apparatus can participate in a wireless network (called "normal Wi-Fi NW" below) formed by the AP. At this stage, the normal Wi-Fi apparatus does not execute a G/O negotiation, and does not selectively determine operation in the G/O state or the CL state. The normal Wi-Fi apparatus can execute a wireless communication for the target data, via the AP, with another apparatus belonging to the normal Wi-Fi NW. Moreover, in case of establishing a connection with the normal Wi-Fi apparatus, the AP describes the MAC address of the normal Wi-Fi apparatus in a management list of the AP.

Moreover, the normal Wi-Fi NW is a wireless network constructed in an environment where an AP can be installed, such as a LAN in a company, a LAN in a household, etc. In general terms, the normal Wi-Fi NW is a wireless network that is to remain formed constantly. In contrast, due to not requiring an AP, the WFD NW is a wireless network constructed for, e.g., executing a temporary wireless communication between a pair of WFD-compatible apparatuses. In general terms, the WFD NW is a wireless network that is to be formed temporarily. Thus, in the present embodiment, it is assumed that the normal Wi-Fi NW is a wireless network that is to remain formed constantly, and the WFD NW is a wireless network that is to be formed temporarily.

Figure 2:
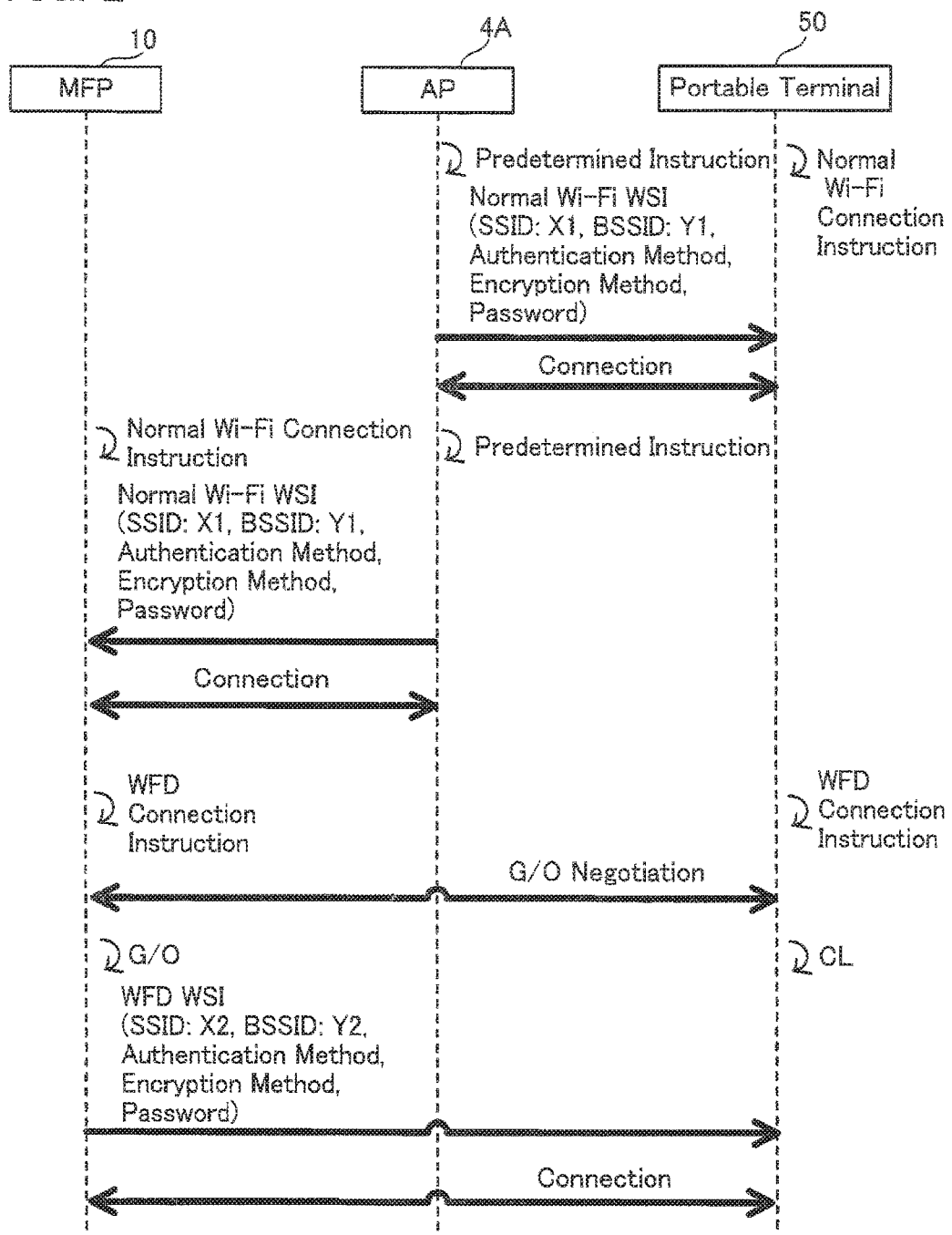
FIG. 2 shows a sequence diagram representing how an MFP and a portable terminal belong to a wireless network.

(Process for MFP 10 and Portable Terminal 50 to Belong to Wireless Network; FIG. 2)

Next, the contents of a process executed by the MFP 10 and the portable terminal 50 will be described. First, the contents of a process for the MFP 10 and the portable terminal 50 to belong to a wireless network (i.e., the normal Wi-Fi NW, the WFD NW) will be described with reference to FIG. 2.

(Process for Belonging to Normal Wi-Fi NW)

In case of wishing to cause the portable terminal 50 to participate in the normal Wi-Fi NW formed by the AP 4A, the user of the portable terminal 50 operates the operating unit 52, executing a normal Wi-Fi connection instruction. The normal Wi-Fi connection instruction includes e.g., selecting an item indicating "wireless LAN" from a menu screen displayed on the displaying unit 54, then selecting, from a network selection screen displayed on the displaying unit 54 (e.g., from among an item indicating "normal Wi-Fi NW", an item indicating "WFD NW"), the item indicating "normal Wi-Fi NW". The user further executes a predetermined instruction in the AP 4A for establishing a connection.

When the normal Wi-Fi connection instruction and the predetermined instruction have been executed, the controller 70 of the portable terminal 50 executes a wireless communication, with the AP 4A, of the data for connecting with the normal Wi-Fi method, this wireless communication being executed via the wireless LAN I/F 60 by using the normal Wi-Fi MAC of the portable terminal 50. Moreover, the controller 70 can know a channel value (e.g., one value among 1 to 14 ch) currently being used by the AP 4A, and executes the wireless communication, with the AP 4A, of the data for connecting by using that channel value. Further, at the stage of the wireless communication of the data for connecting, the controller 70 receives wireless setting information from the AP 4A. The wireless setting information is information currently being used in the normal Wi-Fi NW formed by the AP 4A. Moreover, below, the wireless setting information used in the normal Wi-Fi NW is called "normal Wi-Fi WSI (an abbreviation of Wireless Setting Information)".

The normal Wi-Fi WSI includes an SSID (an abbreviation of Service Set Identifier), a BSSID (an abbreviation of Basic Service Set Identifier), an authentication method, an encryption method, and a password. The SSID and BSSID are identification information for identifying the normal Wi-Fi NW. More specifically, the SSID is a network identifier of the normal Wi-Fi NW, and the BSSID is a MAC address of an AP (the AP 4A in the example of FIG. 2). In FIG. 2, a specific value of the SSID and a specific value of the BSSID are expressed respectively as "X1", "Y1". The authentication method, encryption method, and password are information for executing an authentication of the apparatus, executing an encryption of data, etc. in the normal Wi-Fi NW.

When a wireless communication of the normal Wi-Fi WSI is executed and then a wireless communication for authentication is executed between the AP 4A and the portable terminal 50, a connection is established between the AP 4A and the portable terminal 50. Thereby, the portable terminal 50 can participate in the normal Wi-Fi NW formed by the AP 4A. Moreover, when the portable terminal 50 participates in the normal Wi-Fi NW, the controller 70 stores, in the memory 74, an association of the normal Wi-Fi WSI, and normal belonging information indicating that the portable terminal 50 belongs to the normal Wi-Fi NW.

As with the case of the portable terminal 50, the user of the MFP 10 operates the operating unit 12, executing the normal Wi-Fi connection instruction, and executes the predetermined instruction in the AP 4A. Thereby, by using the normal Wi-Fi MAC of the MFP 10, the controller 30 of the MFP 10 executes a wireless communication with the AP 4A of the data for connecting with the normal Wi-Fi method via the wireless LAN I/F 20.

When a wireless communication of the normal Wi-Fi WSI is executed and then a wireless communication for authentication is executed between the AP 4A and the MFP 10, a connection is established between the AP 4A and the MFP 10. Thereby, the MFP 10 can participate in the normal Wi-Fi NW formed by the AP 4A. Consequently, a state is formed in which the MFP 10 and the portable terminal belong to the same normal Wi-Fi NW. Consequently, by using the normal Wi-Fi NW, the MFP 10 and the portable terminal 50 can execute a wireless communication for the target data via the AP 4A. Moreover, when the MFP 10 participates in the normal Wi-Fi NW, the controller 30 stores, in the memory 34, an association of the normal Wi-Fi WSI, and normal belonging information indicating that the MFP 10 belongs to the normal Wi-Fi NW.

Moreover, the MFP 10 and the portable terminal 50 may each also participate in a normal Wi-Fi NW formed by an AP 4B (see FIG. 1) different from the AP 4A. Further, the MFP 10 may participate in the normal Wi-Fi NW formed by the AP 4A, and the portable terminal 50 may participate in the normal Wi-Fi NW formed by the AP 4B. In this case, the MFP 10 and the portable terminal 50 belong to different normal Wi-Fi NWs, and consequently cannot execute a wireless communication for the target data by using the normal Wi-Fi NW.

(Process for Belonging to WFD NW)

In case of wishing to form a WFD NW to which both the MFP 10 and the portable terminal 50 belong, the user operates the operating unit 52 of the portable terminal 50 to execute a WFD connection instruction. The WFD connection instruction includes e.g., selecting an item indicating "wireless LAN" from a menu screen displayed on the displaying unit 54, and then selecting an item indicating "WFD NW" from a network selection screen displayed on the displaying unit 54. Further, as in the case of the portable terminal 50, the user operates the operating unit 12 of the MFP 10 to execute the WFD connection instruction.

The MFP 10 and the portable terminal 50 execute a G/O negotiation. Specifically, the controller 30 of the MFP 10 executes the G/O negotiation, via the wireless LAN I/F 20, by using the WFD MAC of the MFP 10. Further, the controller 70 of the portable terminal 50 executes the G/O negotiation, via the wireless LAN I/F 60, by using the WFD MAC of the portable terminal 50.

In the G/O negotiation, the controller 30 of the MFP 10 sends information (more specifically, Intent value) indicating G/O priority of the MFP 10 to the portable terminal 50, and receives information from the portable terminal 50 indicating G/O priority of the portable terminal 50. Further, the controller 70 of the portable terminal 50 sends the information indicating G/O priority of the portable terminal 50 to the MFP 10, and receives information from the MFP 10 indicating G/O priority of the MFP 10. The G/O priority of the MFP 10 is an index indicating the degree to which the MFP 10 should assume the G/O state, and is predetermined in the MFP 10. Similarly, the G/O priority of the portable terminal is an index indicating the degree to which the portable terminal 50 should assume the G/O state, and is predetermined in the portable terminal 50.

The controller 30 of the MFP 10 compares the G/O priority of the MFP 10 and the G/O priority of the portable terminal 50, determines that the apparatus with higher priority assumes the G/O state, and determines that the apparatus with lower priority assumes the CL state. The controller 70 of the portable terminal 50 determines the state of the portable terminal 50 by using the same method as the MFP 10. In the example of FIG. 2, it is determined that the MFP 10 is to assume the G/O state, and the portable terminal 50 is to assume the CL state.

In the WFD method, the G/O apparatus prepares the wireless setting information used in the WFD NW. Moreover, below, the wireless setting information used in the WFD NW is called "WFD WSI". As with the normal Wi-Fi WSI, the WFD WSI includes an SSID, a BSSID, an authentication method, an encryption method, and a password. Except for the point that information in the WFD WSI is information to be used in the WFD NW, the information included in the WFD WSI is the same as the information in the normal Wi-Fi WSI. Moreover, the BSSID included in the WFD WSI is the MAC address of the G/O apparatus.

In the example of FIG. 2, since the MFP 10 is the G/O apparatus, the controller 30 of the MFP 10 prepares the WFD WSI. Specifically, the controller 30 prepares the SSID by preparing a predetermined SSID or by newly creating an SSID. The controller 30 prepares the WFD MAC of the MFP 10 as the BSSID. In FIG. 2, a specific value of the SSID and a specific value of the BSSID are expressed respectively as "X2", "Y2". The controller 30 prepares the predetermined authentication method and encryption method. The controller 30 prepares the password by preparing a predetermined password or by newly creating a password.

The controller 30 further determines a channel value to be used in the WFD NW. The wireless LAN I/F 20 of the MFP 10 has the constraint that a channel value for wireless communication used by the normal Wi-Fi MAC, and a channel value for wireless communication used by the WFD MAC must be identical. Consequently, in a state where the MFP 10 belongs to the normal Wi-Fi NW, in a case where the WFD NW is to be formed in which the MFP 10 is the G/O apparatus, the controller 30 determines, as the channel value to be used in the WFD NW, a value which is identical to the channel value currently being used in the normal Wi-Fi NW. On the other hand, in a state where the MFP 10 does not belong to the normal Wi-Fi NW, in the case where the WFD NW is to be formed in which the MFP 10 is the G/O apparatus, the controller 30 determines e.g., a predetermined value as the channel value to be used in the WFD NW. Moreover, the wireless LAN I/F 60 of the portable terminal 50 also has the same constraint as the wireless LAN I/F 20 of the MFP 10.

Next, by using the WFD MAC of the MFP 10, the controller 30 of the MFP 10 executes, with the portable terminal 50 via the wireless LAN I/F 20, a wireless communication of the data for connecting with the WFD method. At the stage of the wireless communication of the data for connecting, the controller 30 sends the prepared WFD WSI to the portable terminal 50.

When the wireless communication of the WFD WSI is executed, and then a wireless communication for authentication is executed between the MFP 10 and the portable terminal 50, a connection is established between the MFP 10 and the portable terminal 50. Thereby, the MFP 10 can form the WFD NW as the G/O apparatus, and the portable terminal 50 can participate in the WFD NW as the CL apparatus. That is, a state is formed in which the MFP 10 and the portable terminal 50 belong to the same WFD NW. Consequently, the MFP 10 and the portable terminal 50 can execute a wireless communication for the target data by using the WFD NW without passing via the AP 4A.

The controller 30 of the MFP 10 stores, in the memory 34, an association of WFD belonging information indicating that the MFP 10 belongs to the WFD NW, WFD state information indicating current state (i.e., G/O state) of the MFP 10, and the WFD WSI. The controller 30 further creates a management list in the memory 34, and describes the WFD MAC of the portable terminal 50 in the management list. Further, the controller 70 of the portable terminal 50 stores, in the memory 74, an association of WFD belonging information indicating that the portable terminal 50 belongs to the WFD NW, WFD state information indicating current state (i.e., CL state) of the portable terminal 50, and the WFD WSI.

Moreover, the MFP 10 may also execute a G/O negotiation with an apparatus (e.g., the PCs 6A, 6B (see FIG. 1)) different from the portable terminal 50, to belong to a WFD NW. Further, the portable terminal 50 may also execute a G/O negotiation with an apparatus different from the MFP 10, to belong to a WFD NW.

Figure 3:
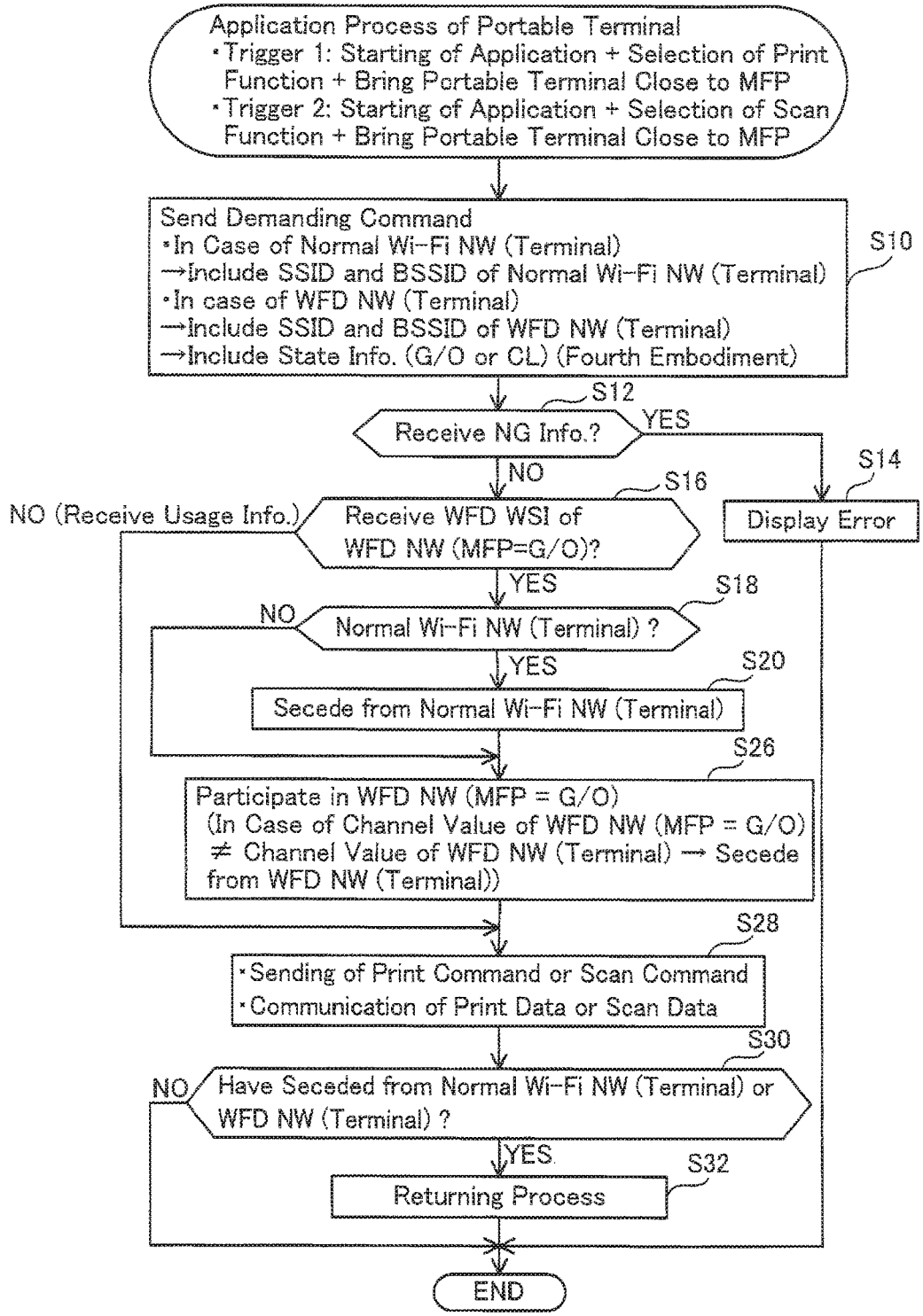
FIG. 3 shows a flowchart of an application process of the portable terminal.

(Application Process of Portable Terminal 50; FIG. 3)

Next, the contents of a process executed by the controller 70 of the portable terminal 50 according to the application 76 will be described with reference to FIG. 3. In case of wishing to cause the MFP 10 to execute the print function or the scan function, the user of the portable terminal 50 operates the operating unit 52, activating the application 76. Next, the user selects an item indicating a predetermined function (e.g., an item indicating "print", an item indicating "scan") from a function selection screen displayed on the displaying unit 54. In case of selecting the print function, the user further specifies data (i.e., print data) that represents an image of a print target.

The NFC I/F 62 of the portable terminal 50 sends detecting radio waves for detecting an apparatus (e.g., the MFP 10) capable of executing an NFC communication. Further, the NFC OF 22 of the MFP 10 sends detecting radio waves for detecting an apparatus (e.g., the portable terminal 50) capable of executing an NFC communication. When the user brings the portable terminal 50 close to the MFP 10, distance between the portable terminal 50 and the MFP 10 becomes less than a distance (e.g., 10 cm) where the radio waves reach one another. In this case, one of the MFP 10 and the portable terminal 50 receives the detecting radio waves sent from the other, and sends response waves. Consequently, an NFC communication session is established between the MFP 10 and the portable terminal 50. In this case, the controller 70 executes a flowchart of FIG. 3.

Further, in case of selecting the scan function, the user brings the portable terminal 50 close to the MFP 10 without specifying data. Consequently, an NFC communication session is established between the MFP 10 and the portable terminal 50. In this case, also, the controller 70 executes the flowchart of FIG. 3.

In S10, by using the NFC communication session, an identification information sending unit 86 sends a demanding command to the MFP 10 via the NFC I/F 62. The demanding command includes function information indicating a function selected by the user (i.e., print or scan). In case the portable terminal 50 belongs to the normal Wi-Fi NW, the demanding command further includes the SSID and the BSSID included in the normal Wi-Fi WSI in the memory 74. Further, in case the portable terminal 50 belongs to the WFD NW, the demanding command further includes the SSID and the BSSID included in the WFD WSI in the memory 74. That is, the demanding command may include two sets of SSID and BSSID (i.e., the SSID and the BSSID of the normal Wi-Fi NW, and the SSID and the BSSID of the WFD NW), may include only one set of SSID and BSSID, or may not include the SSID and the BSSID.

Moreover, in the present embodiment, the demanding command does not include information indicating which network is the network for which the SSID and the BSSID are the ID. In this type of configuration, also, the MFP 10 can appropriately determine whether the MFP 10 and the portable terminal 50 belong to the same wireless network (see S52, S56 of FIG. 4). However, in a variant, the SSID and the BSSID of the normal Wi-Fi NW, and information indicating the normal Wi-Fi NW may be associated in the demanding command, or the SSID and the BSSID of the WFD NW, and information indicating the WFD NW may be associated in the demanding command.

Upon receiving the demanding command from the portable terminal 50, the MFP 10 sends normal usage information (see S54 of FIG. 4), WFD usage information (see S58), the WFD WSI (see S70), or NG information (see S68) to the portable terminal 50 by using the NFC communication session.

In case of receiving the NG information from the MFP 10 via the NFC I/F 62, the controller 70 determines YES in S12, and the process proceeds to S14. In S14, the controller 70 causes an error screen, indicating that a print or scan cannot be executed, to be displayed on the displaying unit 54. Thereby, the user can learn that a wireless communication of the print data or scan data cannot be executed. When S14 ends, the process of FIG. 3 ends.

Further, in case of receiving the WFD WSI from the MFP 10, a setting information receiving unit 87 determines NO in S12, then determines YES in S16, and the process proceeds to S18. The WFD WSI received here is the wireless setting information currently being used in the WFD NW in which the MFP 10 is the G/O apparatus.

Further, in case of receiving the normal usage information or the WFD usage information from the MFP 10, the controller 70 determines NO in S12, then determines NO in S16, and the process proceeds to S28. The normal usage information received here is information for instructing the portable terminal 50 to use the normal Wi-Fi NW. The situation in which the normal usage information is received is a situation in which the MFP 10 and the portable terminal 50 belong to the same normal Wi-Fi NW (see YES in S52 of FIG. 4). Further, the WFD usage information is information for instructing the portable terminal 50 to use the WFD NW. The situation in which the WFD usage information is received is a situation in which the MFP 10 and the portable terminal 50 belong to the same WFD NW (see YES in S56 of FIG. 4).

In S18, a seceding control unit 88 determines whether or not the portable terminal 50 currently belongs to the normal Wi-Fi NW. The seceding control unit 88 determines that the portable terminal 50 currently belongs to the normal Wi-Fi NW (YES in S18) in a case where the normal belonging information is being stored in the memory 74, and proceeds to S20. The seceding control unit 88 determines that the portable terminal 50 does not currently belong to the normal Wi-Fi NW (NO in S18) in a case where the normal belonging information is not being stored in the memory 74, S20 is skipped, and the process proceeds to S26.

Below, a normal Wi-Fi NW to which the portable terminal 50 is belonging is described as "normal Wi-Fi NW (terminal)". Similarly, a WFD NW to which the portable terminal 50 is belonging is described as "WFD NW (terminal)". In particular, a WFD NW in which the portable terminal 50 is the G/O apparatus, and a WFD NW in which the portable terminal 50 is the CL apparatus are described respectively as "WFD NW (terminal=G/O)" and "WFD NW (terminal=CL)". Similarly, descriptions for the MFP 10, also, are "normal Wi-Fi NW (MFP)", "WFD NW (MFP)", "WFD NW (MFP=G/O)", "WFD NW (MFP=CL)".

In S20, the seceding control unit 88 causes the portable terminal 50 to secede from the normal Wi-Fi NW (terminal). Specifically, the seceding control unit 88 sends, via the wireless LAN I/F 60, a seceding signal (e.g., a Disassociation signal) to the AP (e.g., the AP 4A) forming the normal Wi-Fi NW (terminal), disconnecting the connection with the AP. Moreover, even if S20 is executed, the controller 70 does not erase the normal belonging information and the normal Wi-Fi WSI from the memory 74. This is because the portable terminal 50 re-participates in the normal Wi-Fi NW in S32 (to be described).

Moreover, in S26 (to be described), the portable terminal 50 participates in the WFD NW (MFP=G/O), but uses the normal Wi-Fi MAC at this juncture. If S20 is not executed in the case of YES in S18, the portable terminal 50 is belonging to the normal Wi-Fi NW (terminal) by using the normal Wi-Fi MAC. Consequently, the portable terminal 50 cannot use the normal Wi-Fi MAC in S26, and therefore cannot participate in the WFD NW (MFP=G/O). In view of these circumstances, in S20, the portable terminal 50 secedes from the normal Wi-Fi NW (terminal), forming a state in which the normal Wi-Fi MAC is not being used. Thereby, in S26, the portable terminal 50 can appropriately participate in the WFD NW (MFP=G/O) by using the normal Wi-Fi MAC. When S20 ends, the process proceeds to S26.

In S26, by using the normal Wi-Fi MAC, a participating control unit 89 executes a wireless communication with the MFP 10 (i.e., the G/O apparatus), via the wireless LAN I/F 60, of the data for connecting with the normal Wi-Fi method. At this juncture, the participating control unit 89 uses the WFD WSI received in S16. That is, the participating control unit 89 sends the WFD WSI to the MFP 10, and executes a communication for authentication. Consequently, a connection between the portable terminal 50 and the MFP 10 is established. Thereby, the portable terminal 50 can participate in the WFD NW (MFP=G/O).

As described above, in S26, by using the normal Wi-Fi MAC, the portable terminal 50 participates in the WFD NW (MFP=G/O) according to the normal Wi-Fi method (i.e., executes a wireless communication of the data for connecting with the normal Wi-Fi method). Consequently, the portable terminal 50 participates in the WFD NW (MFP=G/O) without executing a G/O negotiation and, further, without shifting to the CL state. In other words, the portable terminal 50 participates in the WFD NW (MFP=G/O) as a normal Wi-Fi apparatus (i.e., a legacy apparatus).

Moreover, it is possible, when S26 is executed, that the portable terminal 50 is belonging to the WFD NW (terminal) by using the WFD MAC. In this case, the portable terminal 50 may secede from the WFD NW (terminal) when S26 is executed. The reason therefore is as follows. That is, as described above, the wireless LAN I/F 60 of the portable terminal 50 has the constraint that the channel value corresponding to the normal Wi-Fi MAC of the portable terminal 50, and the channel value corresponding to the WFD MAC of the portable terminal 50 must be identical. Thereupon, in S26, the participating control unit 89 participates in the WFD NW (MFP=G/O) by using the normal Wi-Fi MAC, but at this juncture uses a channel value that is currently being used in the WFD NW (MFP=G/O) (called "target channel value" below). That is, the channel value corresponding to the normal Wi-Fi MAC becomes the target channel value.

The aforementioned constraint of the wireless LAN I/F 60 is met in case the channel value currently being used in the WFD NW (terminal) (i.e., the channel value corresponding to the WFD MAC of the portable terminal 50), and the target channel value currently being used in the WFD NW (MFP=G/O) (i.e., the channel value corresponding to the normal Wi-Fi MAC of the portable terminal 50), are identical. Consequently, the portable terminal 50 can participate in the WFD NW (MFP=G/O) while maintaining the state of belonging to the WFD NW (terminal). That is, in case the values of the two channels are identical, the participating control unit 89 does not cause the portable terminal 50 to secede from the WFD NW (terminal).

On the other hand, in case the values of the two channels are not identical, the participating control unit 89 changes the channel value corresponding to the WFD MAC of the portable terminal 50 to the target channel value at the time of causing the portable terminal 50 to participate in the WFD NW (MFP=G/O), so that the aforementioned constraint of the wireless LAN I/F 60 is met. In this case, the portable terminal 50 no longer uses the channel value that is actually being used in the WFD NW (terminal), and consequently the portable terminal 50 secedes from the WFD NW (terminal), and shifts to the device state. That is, in the case where the values of the two channels are not identical, the participating control unit 89 causes the portable terminal 50 to secede from the WFD NW (terminal).

Moreover, in S26, in case the portable terminal 50, which is the G/O apparatus, secedes from the WFD NW (terminal=G/O), the controller 70 deletes the WFD belonging information, the WFD state information, and the WFD WSI from the memory 74. This is because in S32 (to be described) the portable terminal 50 cannot re-participate in the WFD NW due to the WFD NW (terminal=G/O) having been dissolved. On the other hand, in S26, in case the portable terminal 50, which is the CL apparatus, secedes from the WFD NW (terminal=CL), the controller 70 does not erase the WFD belonging information, the WFD state information, and the WFD WSI from the memory 74. This is because even if the portable terminal 50 has seceded from the WFD NW (terminal=CL), in S32 (to be described) the portable terminal 50 could re-participate in the WFD NW as the WFD NW may not have been dissolved. When S26 ends, the process proceeds to S28.

Next, the contents of a process of S28 will be described. As described above, a situation in which S28 is executed is: a situation where the normal usage information is received from the MFP 10 (NO in S16); a situation where the WFD usage information is received from the MFP 10 (NO in S16); or a situation where the portable terminal 50 participates in the WFD NW (MFP=G/O) (S26).

In the situation where the normal usage information is received from the MFP 10, the MFP 10 and the portable terminal 50 belong to the same normal Wi-Fi NW (described as "normal Wi-Fi NW (MFP, terminal)" below). In this type of situation, in S28, a communication execution unit 83 executes a wireless communication for the target data with the MFP 10 via the wireless LAN I/F 60 by using the normal Wi-Fi NW (MFP, terminal). Specifically, in case the print function was selected by the user, the communication execution unit 83 sends a print command and print data (e.g., data specified by the user) to the MFP 10. Consequently, the MFP 10 executes a print according to the print data. Further, in case the scan function was selected by the user, the communication execution unit 83 sends a scan command to the MFP 10. Consequently, the MFP 10 executes a scan of a document, creating scan data, and sends the scan data to the portable terminal 50. In this case, the communication execution unit 83 receives the scan data from the MFP 10. The controller 70 stores the scan data in the memory 74 and, further, causes an image represented by the scan data to be displayed on the displaying unit 54.

In the situation where the WFD usage information is received from the MFP 10, the MFP 10 and the portable terminal 50 belong to the same WFD NW (described as "WFD NW (MFP, terminal)" below). In this type of situation, in S28, the communication execution unit 83 executes a wireless communication for the target data with the MFP 10 via the wireless LAN OF 60 by using the WFD NW (MFP, terminal).

Further, in the situation where the portable terminal 50 participates in the WFD NW (MFP=G/O), in S28 the communication execution unit 83 executes a wireless communication for the target data with the MFP 10 via the wireless LAN I/F 60 by using the WFD NW (MFP=G/O). When S28 ends, the process proceeds to S30.

In S30, the controller 70 determines whether or not the portable terminal 50 has seceded from at least one of the normal Wi-Fi NW (terminal) and the WFD NW (terminal). Specifically, in case S20 has been executed, the controller 70 determines YES in S30, and proceeds to S32. Further, the controller 70 also determines YES in S30 and proceeds to S32 in case the portable terminal 50 has seceded from the WFD NW (terminal) as a result of the process of S26. In case of determining NO in S30, the controller 70 skips S32, and ends the process of FIG. 3.

In S32, the controller 70 attempts to cause the portable terminal 50 to again belong the wireless network from which the portable terminal 50 seceded. Moreover, even in case the portable terminal 50 seceded from the WFD NW (terminal=G/O) in S26, YES is determined in S30, and the process proceeds to S32. However, in this case, the WFD NW (terminal=G/O) has been dissolved, and therefore the portable terminal 50 cannot again belong to the WFD NW (terminal=G/O). Consequently, in case the portable terminal 50 has seceded from the WFD NW (terminal=G/O), the controller 70 ends the process of FIG. 3 without executing any process in S32.

On the other hand, in case the portable terminal 50 seceded from the normal Wi-Fi NW (terminal) or the WFD NW (terminal=CL) in S20 or S26, in S32 the controller 70 first sends a seceding signal, via the wireless LAN I/F 60, to the MFP 10 which is the G/O apparatus, and disconnects the connection with the MFP 10. Thereby, the portable terminal 50 can secede from the WFD NW (MFP=G/O). That is, the normal Wi-Fi MAC of the portable terminal 50 assumes a state of not being used.

For example, in case the portable terminal 50 seceded from the normal Wi-Fi NW (terminal) in S20, in S32 the controller 70 executes a wireless communication, with the AP forming that normal Wi-Fi NW, of the data for connecting with the normal Wi-Fi method, this wireless communication being executed via the wireless LAN I/F 60 by using the normal Wi-Fi MAC. At this juncture, the controller 70 uses the normal Wi-Fi WSI that is being maintained in the memory 74. Consequently, a connection is established between the portable terminal 50 and the AP, and the portable terminal 50 can re-participate in the normal Wi-Fi NW.

Further, e.g., in case the portable terminal 50 seceded from the WFD NW (terminal=CL) in S26, in S32 the controller 70 uses the WFD MAC to execute, via the wireless LAN OF 60, a wireless communication, with the G/O apparatus forming the WFD NW, of the data for connecting with the WFD method. At this juncture, the controller 70 uses the WFD WSI that is being maintained in the memory 74. Consequently, a connection is established between the portable terminal 50 and G/O apparatus, and the portable terminal 50 can re-participate in the WFD NW.

Moreover, in case the portable terminal 50 seceded from the WFD NW (terminal=CL) in S26, a number of CL apparatuses belonging to the WFD NW may become zero. In this case, the portable terminal 50 cannot re-participate in the WFD NW in S32 because the WFD NW has been dissolved. In this type of situation, the controller 70 deletes the WFD belonging information, the WFD state information, and the WFD WSI from the memory 74. When S32 ends, the process of FIG. 3 ends.

In the present embodiment in, e.g., a situation where the portable terminal 50 belongs to both the normal Wi-Fi NW (terminal) and the WFD NW (terminal), in S20 the portable terminal 50 secedes from the normal Wi-Fi NW (terminal) and, in S26, participates in the WFD NW (MFP=G/O) as a normal Wi-Fi apparatus (i.e., legacy apparatus) by using the normal Wi-Fi MAC. Instead, adoption of a configuration (called "configuration of the comparative example" below) can be considered in which the portable terminal 50 secedes from the WFD NW (terminal) in S20 and, in S26, participates in the WFD NW (MFP=G/O) as a CL apparatus by using the WFD MAC. However, in the configuration of the comparative example, the number of CL apparatuses belonging to the WFD NW may become zero when the portable terminal 50 secedes from the WFD NW (terminal), and consequently the WFD NW may be dissolved. In this case, the portable terminal 50 cannot re-participate in the WFD NW.

By contrast, in the present embodiment, the normal Wi-Fi NW is not dissolved even if the portable terminal 50 secedes from the normal Wi-Fi NW (terminal) (S20), and consequently the portable terminal 50 can re-participate in the normal Wi-Fi NW (S32). Thus, according to the present embodiment, the portable terminal 50 can be caused to participate in the original wireless network more appropriately than in the configuration of the comparative example. Moreover, in a variant, the configuration of the comparative example may be adopted.

Figure 4:
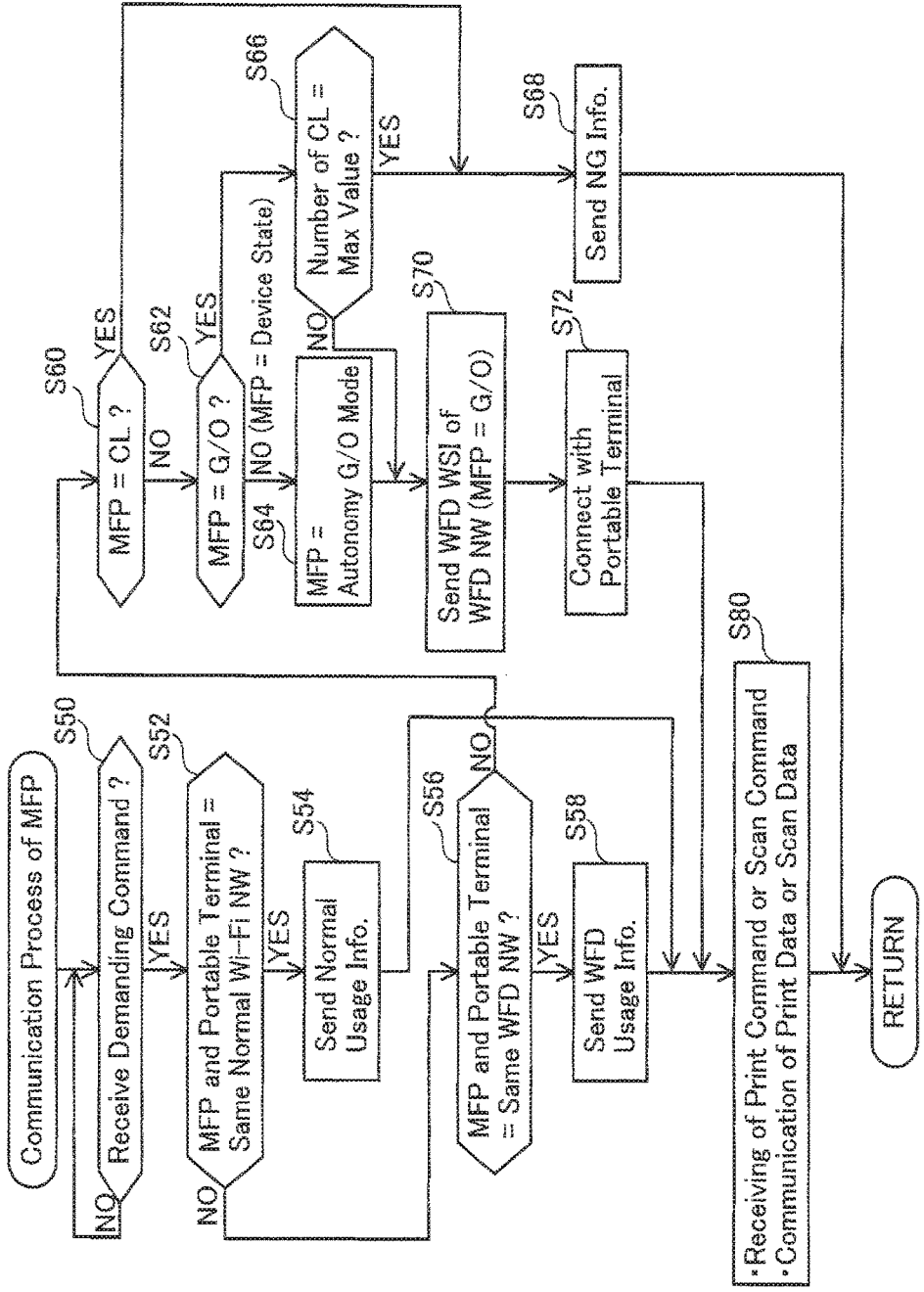
FIG. 4 shows a flowchart of a communication process of the MFP.

(Communication Process of MFP 10; FIG. 4)

Next, the contents of a communication process executed by the controller 30 of the MFP 10 will be described with reference to FIG. 4. In S50, an identification information receiving unit 41 monitors whether the demanding command (see S10 of FIG. 3) is received from the portable terminal 50. In case the demanding command is received from the portable terminal 50 via the NFC I/F 22, the identification information receiving unit 41 determines YES in S50, and the process proceeds to S52.

In S52, the selection unit 42 determines whether or not the MFP 10 and the portable terminal 50 belong to the same normal Wi-Fi NW. As described above, in case the MFP 10 belongs to the normal Wi-Fi NW (MFP), the memory 34 is storing an association of the normal belonging information and the normal Wi-Fi WSI. In case the normal belonging information is not being stored in the memory 34, the selection unit 42 determines that the MFP 10 and the portable terminal 50 do not belong to the same normal Wi-Fi NW (NO in S52), and the process proceeds to S56.

In case the normal belonging information is being stored in the memory 34, the selection unit 42 further executes the following determination process in S52. In case the portable terminal 50 does not belong to any of the normal Wi-Fi NW and the WFD NW, the demanding command does not include even one set of SSID and BSSID. In case the demanding command does not include even one set of SSID and BSSID, the selection unit 42 determines that the MFP 10 and the portable terminal 50 do not belong to the same normal Wi-Fi NW (NO in S52), and the process proceeds to S56.

Further, in case one or more sets of SSID and BSSID are included in the demanding command, the selection unit 42 determines whether or not, among the one or more sets of SSID and BSSID, one set of SSID and BSSID is present which is identical to the SSID and the BSSID of the normal Wi-Fi NW in the memory 34. In case of determining that the one set of SSID and BSSID is not present, the selection unit 42 determines that the MFP 10 and the portable terminal 50 do not belong to the same normal Wi-Fi NW (NO in S52), and the process proceeds to S56. On the other hand, in case of determining that the one set of SSID and BSSID is present, the selection unit 42 determines that the MFP 10 and the portable terminal 50 belong to the same normal Wi-Fi NW (YES in S52), and the process proceeds to S54. Thereby, the selection unit 42 selects only the normal Wi-Fi NW (MFP, terminal).

As described above, in S52 the selection unit 42 determines, by using both the SSID and the BSSID, whether or not the MFP 10 and the portable terminal 50 belong to the same normal Wi-Fi NW. A reason for executing both the determination of whether SSIDs are identical and the determination of whether BSSIDs are identical is as follows.

For example, a situation is assumed in which a first AP (e.g., the AP 4A) forms a first normal Wi-Fi NW, and a second AP (e.g., the AP 4B) different from the first AP forms a second normal Wi-Fi NW. In this case, the BSSID of the first normal Wi-Fi NW is the MAC address of the first AP, and the BSSID of the second normal Wi-Fi NW is the MAC address of the second AP. Since the MAC address is a unique value, the BSSID of the first normal Wi-Fi NW and the BSSID of the second normal Wi-Fi NW are different. However, the SSID is a value that is set at will by the AP or the user. Therefore, the SSID of the first normal Wi-Fi NW and the SSID of the second normal Wi-Fi NW may be the same. Consequently, if a configuration is adopted in which the determination of whether SSIDs are identical is executed but the determination of whether BSSIDs are identical is not executed (e.g., if a configuration is adopted in which the BSSID is not included in the demanding command), the selection unit 42 may determine that the MFP 10 and the portable terminal 50 belong to the same normal Wi-Fi NW, even though the MFP 10 belongs to the first normal Wi-Fi NW and the portable terminal 50 belongs to the second normal Wi-Fi NW. However, the MFP 10 and the portable terminal 50 cannot execute a communication for the target data unless the first AP and the second AP unless are connected by a wire. That is, in case the two BSSIDs are not identical even though the two SSIDs are identical, a situation may occur in which the MFP 10 and the portable terminal 50 cannot execute a communication for the target data. In order to prevent such a situation from occurring, the selection unit 42 executes both the determination of whether SSIDs are identical and the determination of whether BSSIDs are identical.

Further, known APs include an AP capable of simultaneously forming a plurality of normal Wi-Fi NWs. For example, a situation is assumed in which one AP (e.g., the AP 4A) is forming the first normal Wi-Fi NW and the second normal Wi-Fi NW. In this case, the SSID of the first normal Wi-Fi NW and the SSID of the second normal Wi-Fi NW are different, whereas the BSSID of the first normal Wi-Fi NW (i.e., MAC address of the AP) and the BSSID of the second normal Wi-Fi NW (i.e., MAC address of the AP) are the same. Consequently, if a configuration is adopted in which the determination of whether BSSIDs are identical is executed, but the determination of whether SSIDs are identical is not executed (e.g., if a configuration is adopted in which the SSID is not included in the demanding command), the selection unit 42 may determine that the MFP 10 and the portable terminal 50 belong to the same normal Wi-Fi NW, even though the MFP 10 belongs to the first normal Wi-Fi NW and the portable terminal 50 belongs to the second normal Wi-Fi NW. In order to prevent such a situation from occurring, the selection unit 42 executes both the determination of whether SSIDs are identical and the determination of whether BSSIDs are identical.

Moreover, as with S52, in S56 (to be described), also, the selection unit 42 executes both the determination of whether SSIDs are identical and the determination of whether BSSIDs are identical. According to the present embodiment, because the selection unit 42 executes both the determination of whether SSIDs are identical and the determination of whether BSSIDs are identical, the selection unit 42 can appropriately determine whether or not the MFP 10 and the portable terminal 50 belong to the same normal Wi-Fi NW, and, further, can appropriately determine whether or not the MFP 10 and the portable terminal 50 belong to the same WFD NW.

In S54, a usage information sending unit 44 sends the normal usage information to the portable terminal 50 via the NFC I/F 22. Thereby, the portable terminal 50 determines NO in S16 of FIG. 3, and executes a wireless communication for the target data with the MFP 10 (see S28) by using the normal Wi-Fi NW (MFP, terminal).

In S56, the selection unit 42 determines whether or not the MFP 10 and the portable terminal 50 belong to the same WFD NW. In case the MFP 10 belongs to the WFD NW (MFP), the memory 34 is storing an association of the WFD belonging information, the WFD state information, and the WFD WSI. In case the WFD belonging information is not being stored in the memory 34, the selection unit 42 determines that the MFP 10 and the portable terminal 50 do not belong to the same WFD NW (NO in S56), and the process proceeds to S60.

In case the WFD belonging information is being stored in the memory 34, the selection unit 42 further executes a following determination process in S56. That is, in case not even one set of SSID and BSSID is included in the demanding command, the selection unit 42 determines that the MFP 10 and the portable terminal 50 do not belong to the same WFD NW (NO in S56), and the process proceeds to S60.

Further, in case one or more sets of SSID and BSSID are included in the demanding command, the selection unit 42 determines whether or not, among the one or more sets of SSID and BSSID, one set of SSID and BSSID is present which is identical to the SSID and the BSSID of the WFD NW in the memory 34. In case of determining that the one set of SSID and BSSID is not present, the selection unit 42 determines that the MFP 10 and the portable terminal 50 do not belong to the same WFD NW (NO in S56), and the process proceeds to S60. On the other hand, in case of determining that the one set of SSID and BSSID is present, the selection unit 42 determines that the MFP 10 and the portable terminal 50 belong to the same WFD NW (YES in S56), and the process proceeds to S58. Thereby, the selection unit 42 selects only the WFD NW (MFP, terminal).

In S58, the usage information sending unit 44 sends the WFD usage information to the portable terminal 50 via the NFC I/F 22. Thereby, the portable terminal 50 determines NO in S16 of FIG. 3, and executes a wireless communication for the target data with the MFP 10 (see S28) by using the WFD NW (MFP, terminal). When S58 ends, the process proceeds to S80.

In the present embodiment, the selection unit 42 executes the determination of S52 before the determination of S56. Consequently, in a situation where the MFP 10 and the portable terminal 50 belong to the same normal Wi-Fi NW, and the MFP 10 and the portable terminal 50 belong to the same WFD NW (called "specific situation" below), YES is determined in S52, and then in S54 the normal usage information is sent to the portable terminal 50. That is, in the present embodiment, a configuration is adopted in which, in the specific situation, a communication for the target data is executed by using not the WFD NW (MFP, terminal), but by using the normal Wi-Fi NW (MFP, terminal). This prioritizing of the normal Wi-Fi NW (MFP, terminal) is because the normal Wi-Fi NW is a wireless network that is to remain formed constantly, and the WFD NW is a wireless network that is to be formed temporarily.

That is, because the WFD NW is a wireless network that is to be formed temporarily, it is likely that the WFD NW (MFP, terminal) is dissolved before execution of a wireless communication for the target data, or during a wireless communication for the target data. For example, in case the MFP 10 and the portable terminal 50 are each a CL apparatus in the WFD NW (MFP, terminal), the WFD NW (MFP, terminal) is dissolved when a power source of a G/O apparatus (e.g., the PC 6A) is turned OFF. By contrast, since the normal Wi-Fi NW is a wireless network that is to remain formed constantly, it is unlikely that a power source of the AP will be turned OFF. Consequently, if the normal Wi-Fi NW (MFP, terminal) is used, it is likely that a wireless communication for the target data can be executed appropriately. In view of these circumstances, a configuration is adopted in the present embodiment in which the determination of S52 is executed before the determination of S56, i.e., a configuration which prioritizes the normal Wi-Fi NW (MFP, terminal) is adopted.

In case the MFP 10 and the portable terminal 50 do not belong to the same normal Wi-Fi NW, and do not belong to the same WFD NW (in case of NO in S56), the process proceeds to S60. In S60, the controller 30 determines whether or not a current state of the MFP 10 is the CL state. In case the WFD state information is not being stored in the memory 34, i.e., in case the current state of the MFP 10 is the device state, the controller 30 determines that the current state of the MFP 10 is not the CL state (NO in S60), and proceeds to S62. Further, in case the WFD state information in the memory 34 indicates the G/O state, the controller 30 determines that the current state of the MFP 10 is not the CL state (NO in S60), and proceeds to S62. Further, in case the WFD state information in the memory 34 indicates the CL state, the controller 30 determines that the current state of the MFP 10 is the CL state (YES in S60), and proceeds to S68.

In S62, the controller 30 determines whether or not the current state of the MFP 10 is the G/O state. In case the WFD state information is not being stored in the memory 34, i.e., in case the current state of the MFP 10 is the device state, the controller 30 determines that the current state of the MFP 10 is not the G/O state (NO in S62), and proceeds to S64. In case the WFD state information in the memory 34 indicates the G/O state, the controller 30 determines that the current state of the MFP 10 is the G/O state (YES in S62), and proceeds to S66.

In S64, the controller 30 shifts the MFP 10 to an autonomy G/O mode. As described above, when a WFD NW is to be newly formed, usually a G/O negotiation is executed, and the G/O apparatus and the CL apparatus are determined. By contrast, it is determined in the autonomy G/O mode that the MFP 10 is to assume the G/O state without executing a G/O negotiation. At the stage of S64, the MFP 10 is the G/O apparatus and a CL apparatus is not present. However, it could also be said that, when S64 is executed, a WFD NW (MFP=G/O) is formed to which only the G/O apparatus (i.e., the MFP 10) belongs. The autonomy G/O mode is a mode for maintaining operation of the MFP 10 in the G/O state. For example, in case the MFP 10 assumes the G/O state by means of G/O negotiation and forms a WFD NW (MFP=G/O), the MFP 10 will shift from the G/O state to the device state if a CL apparatus becomes no longer present in the WFD NW (MFP=G/O) (i.e., the WFD NW (MFP=G/O) will be dissolved). By contrast, e.g., in case the MFP 10 assumes the G/O state by means of autonomy G/O mode and forms a WFD NW (MFP=G/O), the MFP 10 maintains the G/O state (i.e., the WFD NW (MFP=G/O) is maintained) even if a CL apparatus becomes no longer present.

In S64, the controller 30 also prepares the WFD WSI of the WFD NW (MFP=G/O). A method whereby the controller 30 prepares the WFD WSI is as described above (see the description of FIG. 2). In S64, the controller 30 further stores the management list in the memory 34. However, at this stage, there is no MAC address of any CL apparatus described in the management list. In S64 the controller 30 further stores, in the memory 34, an association of the WFD belonging information, the WFD state information indicating G/O state, and the WFD WSI. When S64 ends, the process proceeds to S70.

In S66, the controller 30 determines whether or not a number of CL apparatuses belonging to the WFD NW (MFP=G/O) is identical to a predetermined maximum value. In case a number of MAC addresses described in the management list of the memory 34 is identical to the maximum value, the controller 30 determines YES in S66, and proceeds to S68. On the other hand, in case the number of MAC addresses described in the management list of the memory 34 is less than the maximum value, the controller 30 determines NO in S66, and proceeds to S70.

A first situation in which S68 is executed is a situation in which the MFP 10 and the portable terminal 50 do not belong to the same wireless network, and the MFP 10 is a CL apparatus (i.e., a situation of YES in S60). In the present embodiment, a security policy has been adopted in which a G/O apparatus has the right to cause another apparatus to participate in the WFD NW, whereas a CL apparatus does not have the right to cause another apparatus to participate in the WFD NW. Consequently, in the first situation, the MFP 10, which is a CL apparatus, cannot cause the portable terminal 50 to participate in the WFD NW (MFP=CL) (i.e., cannot send the WFD WSI of the WFD NW (MFP=CL) to the portable terminal 50).

Further, in the present embodiment, a security policy has been adopted in which a normal Wi-Fi apparatus does not have the right to cause another apparatus to participate in the normal Wi-Fi NW. Consequently, in the first situation, even if the MFP 10 belongs to the normal Wi-Fi NW (MFP), the MFP 10 cannot cause the portable terminal 50 to participate in the normal Wi-Fi NW (MFP) (i.e., cannot send the normal Wi-Fi WSI of the normal Wi-Fi NW (MFP) to the portable terminal 50).

Further, a second situation in which S68 is executed is a situation in which the MFP 10 and the portable terminal 50 do not belong to the same wireless network and the number of CL apparatuses belonging to the WFD NW (MFP=G/O) is identical to the maximum value (i.e., a situation of YES in S66). In the second situation, the MFP 10 has the right to cause another apparatus to participate in the WFD NW (MFP=G/O), but cannot further increase the CL apparatuses which are the administration target.

Consequently, in the first or the second situation, there is no means for the MFP 10 and the portable terminal 50 to execute a wireless communication for the target data, and consequently in S68 the controller 30 sends the NG information to the portable terminal 50 via the NFC I/F 22. Thereby, the portable terminal 50 determines YES in S12 of FIG. 3, and displays the error screen (see S14). When S68 ends, the process returns to S50.

Further, in a situation in which S70 is executed, the MFP 10, which is the G/O apparatus, has the right to cause another apparatus to participate in the WFD NW (MFP=G/O), and can also increase the CL apparatuses which are the administration target. Consequently, a setting information sending unit 45 sends the WFD WSI in the memory 34 to the portable terminal 50 via the NFC I/F 22. When S70 ends, the process proceeds to S72.

As described above, upon receiving the WFD WSI from the MFP 10, the portable terminal 50 determines YES in S16 of FIG. 3, and executes a wireless communication, with the MFP 10, of the data for connecting with the normal Wi-Fi method (see S26). In S72, the controller 30 executes a wireless communication, with the portable terminal 50, of the data for connecting via the wireless LAN I/F 20, and establishes a connection with the portable terminal 50. In this case, the controller 30 describes the normal Wi-Fi MAC address of the portable terminal 50 in the management list of the memory 34. Thereby, the portable terminal 50 can participate in the WFD NW (MFP=G/O). When S72 ends, the process proceeds to S80.

Next, the contents of a process of S80 will be described. As described above, a situation in which S80 is executed is: the situation in which the normal usage information is sent to the portable terminal 50 (S54); the situation in which the WFD usage information is sent to the portable terminal 50 (S58); or the situation in which the portable terminal 50 participates in the WFD NW (MFP=G/O) (S72).

In the situation in which the normal usage information is sent to the portable terminal 50, in S80 a communication execution unit 43 executes a wireless communication for the target data with the portable terminal 50 via the wireless LAN I/F 20 by using the normal Wi-Fi NW (MFP, terminal). For example, the communication execution unit 43 receives the print command and the print data from the portable terminal 50. In this case, the controller 30 activates a print process thread (not shown), supplying the print data to the print execution unit 16. Thereby, the print execution unit 16 executes a print according to the print data. Further, e.g., the communication execution unit 43 receives the scan command from the portable terminal 50. In this case, the controller 30 activates a scan process thread (not shown), supplying a scan executing instruction to the scan execution unit 18. Thereby, the scan execution unit 18 executes a scan of a document, creating scan data. Thereupon, in S80 the communication execution unit 43 sends the scan data to the portable terminal 50.

In the situation in which the WFD usage information is sent to the portable terminal 50, in S80 the communication execution unit 43 executes a wireless communication for the target data with the portable terminal 50 via the wireless LAN I/F 20 by using the WFD NW (MFP, terminal).

Further, in the situation in which the portable terminal 50 participates in the WFD NW (MFP=G/O), in S80 the communication execution unit 43 executes a wireless communication for the target data with the portable terminal 50 via the wireless LAN I/F 20 by using the WFD NW (MFP=G/O). When S80 ends, the process returns to S50.

The target data (i.e., the print data or the scan data) has a comparatively large data size. Therefore, a communication speed of an NFC communication is slower than a communication speed of a WFD communication or a normal Wi-Fi communication. Consequently, if a configuration is adopted in which a wireless communication for the target data between the MFP 10 and the portable terminal 50 is executed by using an NFC communication, a long time is required for the wireless communication for the target data. By contrast, in the present embodiment, the MFP 10 and the portable terminal 50 execute a wireless communication for the target data via the wireless LAN I/Fs 20, 60 (see S28 of FIG. 3, S80 of FIG. 4), and consequently can execute a wireless communication for the target data rapidly.

(Specific Cases)

Next, contents of specific cases realized according to the flowcharts of FIG. 3 and FIG. 4 will be described with reference to FIG. 5 to FIG. 8. In FIG. 5 to FIG. 8, thin arrows represent NFC communication, and fat arrows represent normal Wi-Fi communication or WFD communication. This point is the same in all figures from the second embodiment onward (e.g., FIG. 10, etc.).

(Case 1-1; FIG. 5)

In case 1-1, the MFP 10 and the portable terminal 50 belong to a same normal Wi-Fi NW formed by the AP 4A. The SSID and the BSSID of the normal Wi-Fi NW are "X1, Y1". The MFP 10 and the portable terminal 50, further, belong to a same WFD NW. In the WFD NW, the MFP 10 is a G/O apparatus, and the portable terminal 50 is a CL apparatus. The SSID and the BSSID of the WFD NW are "X2, Y2".

After the user operates the operating unit 52 of the portable terminal 50, inputting a print instruction (i.e., activates the application 76, selects the print function, specifies the print data), the user brings the portable terminal 50 close to the MFP 10. In this case, the portable terminal 50 executes an NFC communication, and sends function information indicating the print function and a demanding command including "X1, Y1" and "X2, Y2" to the MFP 10 (S10 of FIG. 3).

Upon receiving the demanding command from the portable terminal 50 (YES in S50 of FIG. 4), the MFP 10 determines that the one set of SSID and BSSID "X1, Y1" in the memory 34, and the one set of the SSID and BSSID"1, Y1" in the demanding command are identical (YES in S52). That is, the MFP 10 determines that the MFP 10 and the portable terminal 50 belong to the same normal Wi-Fi NW (MFP, terminal). Consequently, the MFP 10 sends the normal usage information to the portable terminal 50 by using an NFC communication (S54).

Upon receiving the normal usage information from the MFP 10 (NO in S12, NO in S16 of FIG. 3), the portable terminal 50 sends the print command and the print data to the MFP 10 via the AP 4A by using the normal Wi-Fi NW (MFP, terminal) (S28).

The MFP 10 receives the print command and the print data from the portable terminal 50 via the AP 4A by using the normal Wi-Fi NW (MFP, terminal) (S80 of FIG. 4). In this case, the MFP 10 executes a print according to the print data.

Further, after operating the operating unit 52 of the portable terminal 50 to input a scan instruction (i.e., activating the application 76 and selecting the scan function), the user brings the portable terminal 50 close to the MFP 10. In this case, the portable terminal 50 executes an NFC communication, sending function information indicating the scan function and a demanding command including "X1, Y1" and "X2, Y2" to the MFP 10 (S10 of FIG. 3).

Upon receiving the demanding command from the portable terminal 50 (YES in S50 of FIG. 4), as with the case of printing, the MFP 10 determines that the MFP 10 and the portable terminal 50 belong to the same normal Wi-Fi NW (MFP, terminal) (YES in S52). Consequently, the MFP 10 sends the normal usage information to the portable terminal 50 by using an NFC communication (S54).

Upon receiving the normal usage information from the MFP 10 (NO in S12, NO in S16 of FIG. 3), the portable terminal 50 sends the scan command to the MFP 10 via the AP 4A by using the normal Wi-Fi NW (MFP, terminal) (S28).

The MFP 10 receives the scan command from the portable terminal 50 via the AP 4A by using the normal Wi-Fi NW (MFP, terminal) (S80 of FIG. 4). In this case, the MFP 10 creates scan data, and sends the scan data to the portable terminal 50 by using the normal Wi-Fi NW (MFP, terminal) (S80).

The portable terminal 50 receives the scan data from the MFP 10 via the AP 4A by using the normal Wi-Fi NW (MFP, terminal) (S28 of FIG. 3). In this case, the portable terminal 50 stores the scan data in the memory 74, and causes an image represented by the scan data to be displayed on the displaying unit 54.

According to case 1-1, in the situation in which the MFP 10 and the portable terminal 50 belong to the same normal Wi-Fi NW and the same WFD NW (i.e., the specific situation), the MFP 10 can appropriately select only the normal Wi-Fi NW (MFP, terminal). Consequently, the MFP 10 and the portable terminal 50 can appropriately execute a wireless communication for the target data by using the normal Wi-Fi NW (MFP, terminal).

In particular, in the specific situation, the MFP 10 preferentially selects not the WFD NW (MFP, terminal) that is to be constructed temporarily, but the normal Wi-Fi NW (MFP, terminal) that is to remain constructed constantly. Consequently, the MFP 10 and the portable terminal 50 can appropriately execute a wireless communication for the target data by using the normal Wi-Fi NW (MFP, terminal) which is unlikely to be dissolved.

(Case 1-2; FIG. 5)

In case 1-2, the portable terminal 50 belongs to the normal Wi-Fi NW (SSID and BSSID="X1, Y1") formed by the AP 4A, whereas the MFP 10 does not belong to the normal Wi-Fi NW. Further, the MFP 10 and the portable terminal 50 belong to the same WFD NW (MFP=G/O apparatus, portable terminal 50=CL apparatus, SSID and BSSID="X2, Y2").

When the MFP 10 receives the demanding command from the portable terminal 50 (YES in S50 of FIG. 4), the normal belonging information is not being stored in the memory 34, and consequently the MFP 10 determines that the MFP 10 and the portable terminal 50 do not belong to the same normal Wi-Fi NW (NO in S52). Next, the MFP 10 determines that the one set of SSID and BSSID "X2, Y2" in the memory 34, and the one set of SSID and BSSID "X2, Y2" in the demanding command are identical (YES in S56). That is, the MFP 10 determines that the MFP 10 and the portable terminal 50 belong to the same WFD NW (MFP, terminal). Consequently, the MFP 10 sends the WFD usage information to the portable terminal 50 by using an NFC communication (S58).

Upon receiving the WFD usage information from the MFP 10 (NO in S12, NO in S16 of FIG. 3), the portable terminal 50 sends the print command and the print data directly to the MFP 10 not via another device by using the WFD NW (MFP, terminal) (S28).

The MFP 10 receives the print command and the print data directly from the portable terminal 50 not via another device by using the WFD NW (MFP, terminal) (S80 of FIG. 4). In this case, the MFP 10 executes a print according to the print data.

According to case 1-2, in case the MFP 10 and the portable terminal 50 do not belong to the same normal Wi-Fi NW, but belong to the same WFD NW, the MFP 10 can appropriately select only the WFD NW (MFP, terminal). Consequently, the MFP 10 and the portable terminal 50 can appropriately execute a wireless communication for the target data not via another device by using the WFD NW (MFP, terminal).

(Case 1-3; FIG. 6)

In case 1-3, the MFP 10 and the portable terminal 50 belong to the same normal Wi-Fi NW (SSID and BSSID="X1, Y1"). Further, the portable terminal 50 belongs to a WFD NW (PC 6A=G/O apparatus, portable terminal 50=CL apparatus, SSID and BSSID="X3, Y3") formed by the PC 6A, whereas the MFP 10 does not belong to that WFD NW.

Upon receiving the demanding command from the portable terminal 50 (YES in S50 of FIG. 4), as in case 1-1 of FIG. 5, the MFP 10 determines that the MFP 10 and the portable terminal 50 belong to the same normal Wi-Fi NW (MFP, terminal) (YES in S52). Consequently, the MFP 10 sends the normal usage information to the portable terminal 50 by using an NFC communication (S54). Subsequent processes are the same as the case of printing of case 1-1 of FIG. 5.

According to case 1-3, in case the MFP 10 and the portable terminal 50 do not belong to the same WFD NW, but belong to the same normal Wi-Fi NW (MFP, terminal), the MFP 10 can appropriately select only the normal Wi-Fi NW (MFP, terminal). Consequently, the MFP 10 and the portable terminal 50 can appropriately execute a wireless communication for the target data by using the normal Wi-Fi NW (MFP, terminal).

(Case 1-4; FIG. 6)

In case 1-4, the portable terminal 50 belongs to the normal Wi-Fi NW (SSID and BSSID="X1, Y1") formed by the AP 4A, whereas the MFP 10 does not belong to that normal Wi-Fi NW. Further, the MFP 10 and the portable terminal 50 belong to the same WFD NW (MFP=CL apparatus, portable terminal 50=CL apparatus, SSID and BSSID="X3, Y3") formed by the PC 6A, which is a G/O apparatus.

Upon receiving the demanding command from the portable terminal 50 (YES in S50 of FIG. 4), as with case 1-2 of FIG. 5, the MFP 10 determines that the MFP 10 and the portable terminal 50 belong to the same WFD NW (MFP, terminal) (YES in S56). Consequently, the MFP 10 sends the WFD usage information to the portable terminal 50 by using an NFC communication (S58).

Upon receiving the WFD usage information from the MFP 10 (NO in S12, NO in S16 of FIG. 3), the portable terminal 50 sends the print command and the print data to the MFP 10 via the PC 6A, which is the G/O apparatus, by using the WFD NW (MFP, terminal) (S28).

The MFP 10 receives the print command and the print data from the portable terminal 50 via the PC 6A, which is the G/O apparatus, by using the WFD NW (MFP, terminal) (S80 of FIG. 4). In this case, the MFP 10 executes a print according to the print data.

According to case 1-4, in case the MFP 10 and the portable terminal 50 do not belong to the same normal Wi-Fi NW, but belong to the same WFD NW in which the PC 6A is the G/O apparatus, the MFP 10 can appropriately select only the WFD NW (MFP, terminal). Consequently, the MFP 10 and the portable terminal 50 can appropriately execute a wireless communication for the target data via the PC 6A, which is the G/O apparatus, by using the WFD NW (MFP, terminal).

(Case 1-5; FIG. 7)

In case 1-5, the portable terminal 50 belongs to the normal Wi-Fi NW (SSID and BSSID="X1, Y1") formed by the AP 4A, and to the WFD NW (portable terminal 50=CL apparatus, SSID and BSSID="X3, Y3") formed by the PC 6A, which is the G/O apparatus. Moreover, in the normal Wi-Fi NW, "CH3" is being used as the channel value. The MFP 10 does not belong to the WFD NW, but belongs to the normal Wi-Fi NW (SSID and BSSID="X4, Y4") formed by the AP 4B. Moreover, in the normal Wi-Fi NW, "CH4" is being used as the channel value.

Upon receiving the demanding command from the portable terminal 50 (YES in S50 of FIG. 4), the MFP 10 determines that neither the one set of SSID and BSSID "X1, Y1" in the demanding command or the one set of SSID and BSSID "X3, Y3" in the demanding command are identical to the one set of SSID and BSSID "X4, Y4" in the memory 34 (NO in S52). That is, it is determined that the MFP 10 and the portable terminal 50 do not belong to the same normal Wi-Fi NW. Further, since the WFD belonging information is not being stored in the memory 34, the MFP 10 determines that the MFP 10 and the portable terminal 50 do not belong to the same WFD NW (NO in S56).

Because the MFP 10 is in a state of not belonging to the WFD NW, i.e., is in the device state, NO is determined in S60, and then NO is determined in S62. Thereupon, the MFP 10 shifts to the autonomy G/O mode and forms the WFD NW (MFP=G/O) (S64). At this stage, the MFP 10 prepares the WFD WSI (SSID and BSSID="X5, Y5"). Moreover, since the channel value being used in the normal Wi-Fi NW (MFP) is "CH4", the MFP 10 determines "CH4" as the channel value to be used in the WFD NW (MFP=G/O). This is to meet the constraint of the wireless LAN I/F 20 of the MFP 10. Thereupon, the MFP 10 sends the WFD WSI to the portable terminal 50 by using an NFC communication (S70).

Upon receiving the WFD WSI from the MFP 10 (NO in S12, YES in S16 of FIG. 3), the portable terminal 50 determines that the portable terminal 50 belongs to the normal Wi-Fi NW (terminal) because the normal belonging information is being stored in the memory 34 (YES in S18). In this case, the portable terminal 50 secedes from the normal Wi-Fi NW (terminal) (S20).

In case A, the channel value "CH3" being used in the WFD NW (terminal), and the channel value "CH4" being used in the WFD NW (MFP=G/O) are identical. The portable terminal 50 establishes a connection with the MFP 10, which is the G/O apparatus, by using the WFD WSI (S26 of FIG. 3). At this juncture, the portable terminal 50 establishes a connection, with the MFP 10, as a normal Wi-Fi apparatus (i.e., legacy apparatus) by using the normal Wi-Fi MAC. Thereby, the portable terminal 50 participates in the WFD NW (MFP=G/O) as a normal Wi-Fi apparatus. Since the channel value "CH3" and the channel value "CH4" are identical, when the portable terminal 50 participates in the WFD NW (MFP=G/O) using the channel value "CH4", the portable terminal 50 does not need to secede from the WFD NW (terminal) using the same channel value "CH3". Thereupon, the portable terminal 50 sends the print command and the print data to the MFP 10 not via another device by using the WFD NW (MFP=G/O) (S28).

The MFP 10 receives the print command and the print data from the portable terminal 50 not via another device by using the WFD NW (MFP, terminal) (S80 of FIG. 4). In this case, the MFP 10 executes a print according to the print data.

Since the portable terminal 50 has seceded from the normal Wi-Fi NW, YES is determined in S30 of FIG. 3 and, first, the portable terminal 50 secedes from the WFD NW (MFP=G/O) (S32). Next, the portable terminal 50 re-establishes a connection with the AP 4A by using the normal Wi-Fi MAC (S32). Thereby, the portable terminal 50 can re-participate in the normal Wi-Fi NW.

In case B, the channel value "CH3" being used in the WFD NW (terminal), and the channel value "CH4" being used in the WFD NW (MFP=G/O) are not identical. In this case, when the portable terminal 50 is to participate in the WFD NW (MFP=G/O) by using the channel value "CH4", the portable terminal 50 must secede from the WFD NW (terminal) that is using the channel value "CH3" different from the channel value "CH4". Communication of the print command and the print data are the same as case A.

Since the portable terminal 50 has seceded from the normal Wi-Fi NW and the WFD NW, YES is determined in S30 of FIG. 3 and, first, the portable terminal 50 secedes from the WFD NW (MFP=G/O) (S32). Next, the portable terminal 50 re-establishes a connection with the AP 4A by using the normal Wi-Fi MAC (S32). The portable terminal 50, further, re-establishes a connection with the PC 6A, which is the G/O apparatus, by using the WFD MAC (S32). Thereby, the portable terminal 50 can again participate in the normal Wi-Fi NW and the WFD NW.

According to case 1-5, in case the MFP 10 and the portable terminal 50 do not belong to the same normal Wi-Fi NW and do not belong to the same WFD NW, the MFP 10 shifts to the autonomy G/O mode, and can appropriately form the WFD NW (MFP=G/O). Consequently, the MFP 10 and the portable terminal 50 can appropriately execute a wireless communication for the target data not via another device by using the WFD NW (MFP=G/O).

Further, in case 1-5, if a configuration were adopted in which the portable terminal 50 secedes not from the normal Wi-Fi NW (terminal), but from the WFD NW (terminal=CL), the WFD NW could be dissolved. This is because the WFD NW is dissolved when the number of CL apparatuses belonging to the WFD NW becomes zero. In this case, the portable terminal 50 cannot re-participate in this WFD NW. By contrast, in case 1-5, since the portable terminal 50 does not secede from the WFD NW (terminal=CL), but secedes from the normal Wi-Fi NW (terminal), the portable terminal 50 can re-participate in the normal Wi-Fi NW after a wireless communication for the target data has ended.

(Case 1-6; FIG. 8)

In case 1-6, a state of the portable terminal 50 is similar to that of case 1-5 of FIG. 7. Further, the MFP 10 belongs to not only the normal Wi-Fi NW (SSID and BSSID="X4, Y4") formed by the AP 4B, but also to the WFD NW (MFP=G/O apparatus, PC 6B=CL apparatus, SSID and BSSID="X6, Y6"). Moreover, in the WFD NW, "CH6" is being used as the channel value.

Upon receiving the demanding command from the portable terminal 50 (YES in S50 of FIG. 4), the MFP 10 determines, as with case 1-5 of FIG. 7, that the MFP 10 and the portable terminal 50 do not belong to the same normal Wi-Fi NW (NO in S52). Further, the MFP 10 determines that neither the one set of SSID and BSSID "X1, Y1" in the demanding command, or the one set of SSID and BSSID "X3, Y3" in the demanding command is identical to the one set of SSID and BSSID "X6, Y6" in the memory 34 (NO in S56). That is, the MFP 10 determines that the MFP 10 and the portable terminal 50 do not belong to the same WFD NW.

Since the MFP 10 is in the G/O state, the MFP 10 determines NO in S60, and then determines YES in S62. In the present case, a number of CL apparatuses belonging to the WFD NW (MFP=G/O) is less than the maximum value, and consequently the MFP 10 determines NO in S66. Thereupon, the MFP 10 sends the WFD WSI in the memory 34 to the portable terminal 50 by using an NFC communication (S70).

Upon receiving the WFD WSI from the MFP 10 (NO in S12, YES in S16 of FIG. 3), the portable terminal 50 secedes from the normal Wi-Fi NW (terminal) (S20), as with case A of case 1-5 of FIG. 7, and participates in the WFD NW (MFP=G/O) as a normal Wi-Fi apparatus (S26). Since the channel value "CH3" and the channel value "CH6" are identical, when the portable terminal 50 participates in the WFD NW (MFP=G/O), the portable terminal 50 does not need to secede from the WFD NW (terminal). Subsequent operations are the same as case A of case 1-5 of FIG. 7.

According to case 1-6, in case the MFP 10 and the portable terminal 50 do not belong to the same normal Wi-Fi NW, and do not belong to the same WFD NW, the MFP 10 causes the portable terminal 50 to participate in the existing WFD NW (MFP=G/O), and can appropriately form the WFD NW (MFP, terminal). Consequently, the MFP 10 and the portable terminal 50 can appropriately execute a wireless communication for the target data not via another device by using the WFD NW (MFP, terminal).

(Case 1-7; FIG. 8)

In case 1-7, a state of the portable terminal 50 is the same as in case 1-6. A state of the MFP 10 is the same as in case 1-6 except for the point that the MFP 10 belongs to a WFD NW in which the MFP 10 is a CL apparatus (MFP=CL apparatus, SSID and BSSID="X7, Y7").

The MFP 10 determines that the MFP 10 and the portable terminal 50 do not belong to the same normal Wi-Fi NW (NO in S52), and determines that the MFP 10 and the portable terminal 50 do not belong to the same WFD NW (NO in S56). Thereupon, since the state of the MFP 10 is the CL state, the MFP 10 determines YES in S60. In this case, the MFP 10 sends the NG information to the portable terminal 50 by using an NFC communication (S70).

Upon receiving the NG information from the MFP 10 (YES in S12 of FIG. 3), the portable terminal 50 causes the error screen to be displayed on the displaying unit 54 (S14). Thereby, the user can learn that a wireless communication for the target data cannot be executed between the MFP 10 and the portable terminal 50.

(Corresponding Relationships)

The MFP 10 and the portable terminal 50 are respectively examples of the "first communication apparatus" and the "second communication apparatus". The NFC I/F 22 (or 62) and the wireless LAN I/F 20 (or 60) are respectively examples of the "first type of interface" and the "second type of interface". The G/O state and the CL state are respectively examples of the "parent station state" and the "child station state". The WFD method having the G/O negotiation scheme, and the normal Wi-Fi method not having the G/O negotiation scheme are respectively examples of the "first wireless communication method" and the "second wireless communication method". Further, the print command and the print data (or the scan command and the scan data) are an example of the "target data".

In case 1-1 of FIG. 5, the WFD NW (MFP, terminal) and the normal Wi-Fi NW (MFP, terminal) are respectively examples of the "first wireless network" and the "second wireless network". Consequently, the SSID and the BSSID "X2, Y2", and the SSID and the BSSID "X1, Y1" are respectively examples of the "first identification information" and the "second identification information". Thereupon, "X2", "Y2", "X1", "Y1" are respectively examples of the "first SSID", the "first BSSID", the "second SSID" and the "second BSSID". Further, the normal Wi-Fi NW (MFP, terminal) is an example of the "at least one wireless network" and the "target wireless network", and the normal usage information is an example of the "usage information". Further, in case 1-2 of FIG. 5, the WFD NW (MFP, terminal) is an example of the "at least one wireless network" and the "target wireless network", and the WFD usage information is an example of the "usage information".

Further, in case 1-5 of FIG. 7, the WFD NW (MFP=G/O), the normal Wi-Fi NW (terminal) and the WFD NW (terminal=CL) are respectively examples of the "third wireless network", the "one wireless network" and the "other wireless network". Further, the channel value "CH3" and the channel value "CH4" are respectively examples of the "first wireless channel value" and the "second wireless channel value".

Figure 9:
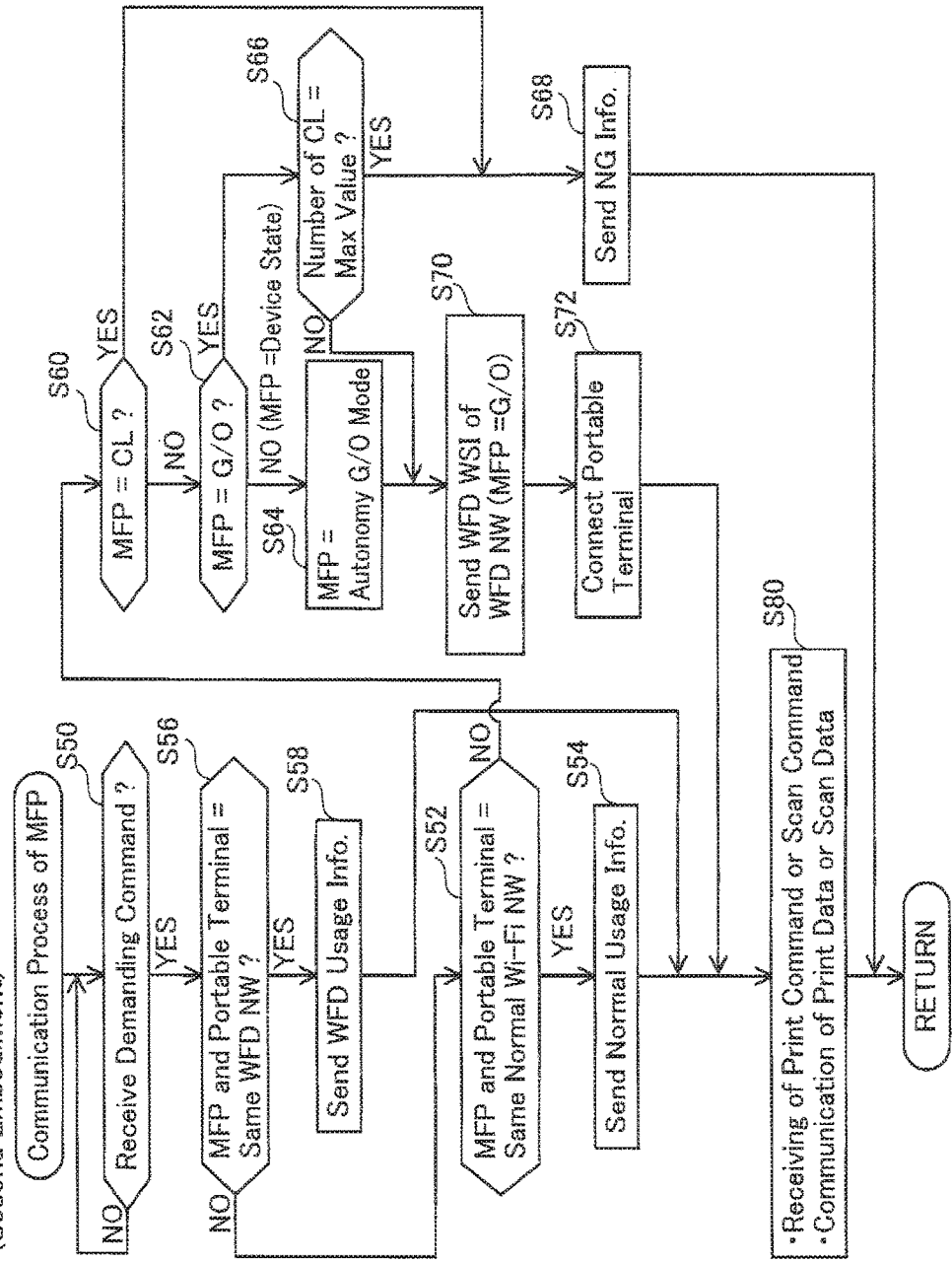
FIG. 9 shows a flowchart of a communication process of the MFP of a second embodiment.

Second Embodiment; FIG. 9

Points differing from the first embodiment will be described. In the present embodiment, the controller 30 of the MFP 10 executes a flowchart of FIG. 9 instead of the flowchart of FIG. 4. In the present embodiment, unlike the first embodiment, the selection unit 42 executes the determination of S56 before the determination of S52. Consequently, in a situation where the MFP 10 and the portable terminal 50 belong to the same normal Wi-Fi NW, and the MFP 10 and the portable terminal 50 belong to the same WFD NW (i.e., the specific situation), YES is determined in S56, and then in S58 the normal usage information instructing use of the WFD NW is sent to the portable terminal 50. That is, in the specific situation, the selection unit 42 selects only the WFD NW (MFP, terminal).

Figure 10:
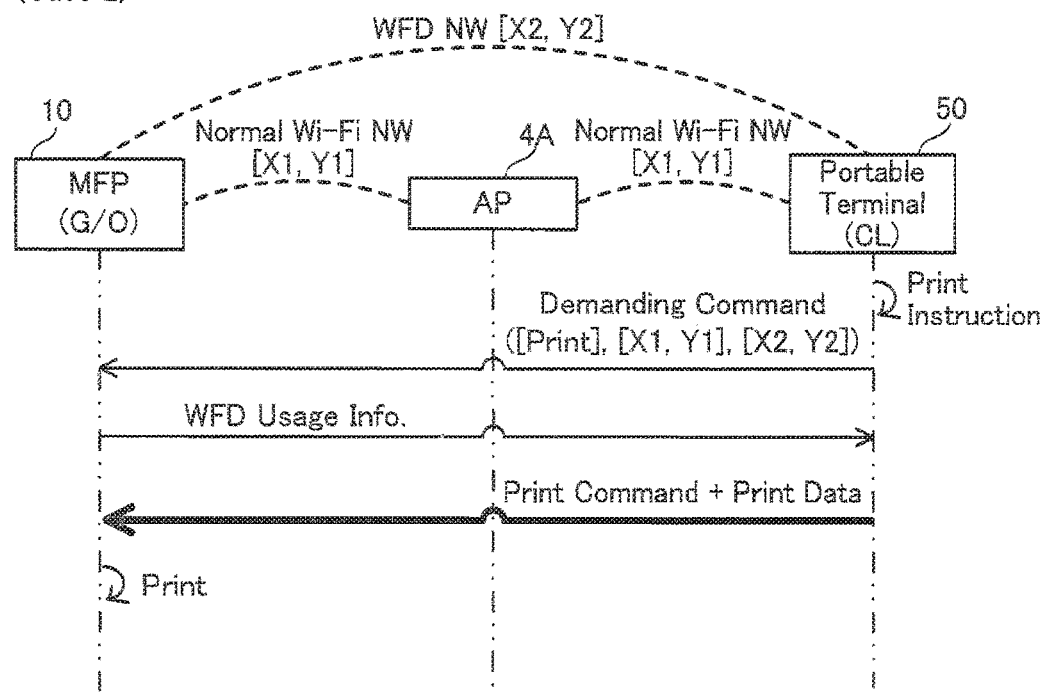
FIG. 10 shows a sequence diagram of case 2.

(Case 2; FIG. 10)

In case 2, the MFP 10 and the portable terminal 50 have a state the same as case 1-1 (i.e., the specific situation). Upon receiving the demanding command from the portable terminal 50 (YES in S50 of FIG. 9), the MFP 10 determines that the MFP 10 and the portable terminal 50 belong to the same WFD NW (YES in S56). Consequently, the MFP 10 sends the WFD usage information to the portable terminal 50 by using an NFC communication, (S58). Subsequent operations are the same case 1-2 of FIG. 5.

According to case 2, in the specific situation, the MFP 10 can appropriately select only the WFD NW (MFP, terminal). Consequently, the MFP 10 and the portable terminal 50 can appropriately execute a wireless communication for the target data by using the WFD NW (MFP, terminal).

Known APs include APs having a privacy separator function. The privacy separator function is a function for preventing a relay of wireless communication between communication apparatuses. For example, in case 2, in case a privacy separator function of the AP 4A is enabled, the MFP 10 and the portable terminal 50 cannot execute a wireless communication for the target data via the AP 4A. In view of these circumstances, in the present embodiment, the MFP 10 preferentially selects not the normal Wi-Fi NW (MFP, terminal), but the WFD NW (MFP, terminal). Thereby, even if the privacy separator function of the AP 4A is enabled, the MFP 10 and the portable terminal 50 can appropriately execute a wireless communication for the target data by using the WFD NW (MFP, terminal).

Figure 11:
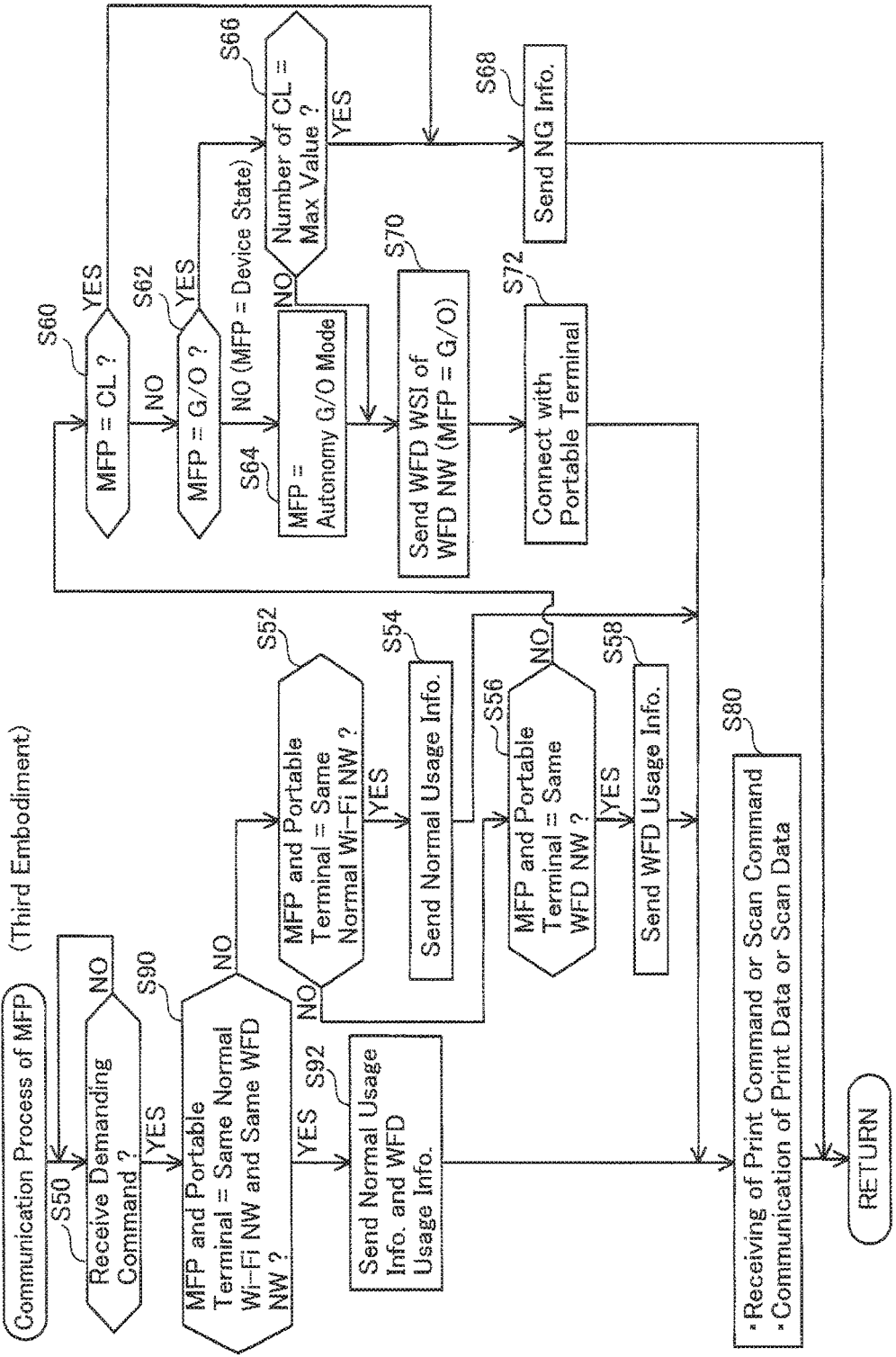
FIG. 11 shows a flowchart of a communication process of the MFP of a third embodiment.

Third Embodiment; FIG. 11

Points differing from the first embodiment will be described. In the present embodiment, the controller 30 of the MFP 10 executes a flowchart of FIG. 11 instead of the flowchart of FIG. 4. In the present embodiment, the selection unit 42 executes a determination of S90. In S90, the selection unit 42 determines whether or not the MFP 10 and the portable terminal 50 belong to the same normal Wi-Fi NW and the same WFD NW. Specifically, in case two sets of SSID and BSSID are not included in the demanding command, the selection unit 42 determines NO in S90 and the process proceeds to S52. Processes from S52 onwards are the same as those of FIG. 4.

Further, in case the first set of SSID and BSSID, among the two sets of SSID and BSSID in the demanding command, is identical to the SSID and the BSSID of the normal Wi-Fi NW in the memory 34, and the second set of SSID and BSSID, among the two sets of SSID and BSSID in the demanding command, is identical to the SSID and the BSSID of the WFD NW in the memory 34, the selection unit 42 determines YES in S90, and the process proceeds to S92. Thereby, the selection unit 42 selects both the normal Wi-Fi NW and the WFD NW.

In S92, the usage information sending unit 44 sends both the normal usage information and the WFD usage information to the portable terminal 50 via the NFC I/F 22. Thereby, the portable terminal 50 determines NO in S16 of FIG. 3, and executes a wireless communication for the target data with the MFP 10 by using one wireless network from among the normal Wi-Fi NW (MFP, terminal) and the WFD NW (MFP, terminal) (see S28). There is no particular restriction on a method used by the portable terminal 50 to select the one wireless network. For example, in case the portable terminal 50 is executing a communication of the print data, the scan data, etc. with another device by using one wireless network from among the normal Wi-Fi NW (MFP, terminal) and the WFD NW (MFP, terminal), the portable terminal 50 may select the other wireless network. Further, e.g., the portable terminal 50 may select a wireless network randomly.

Figure 12:
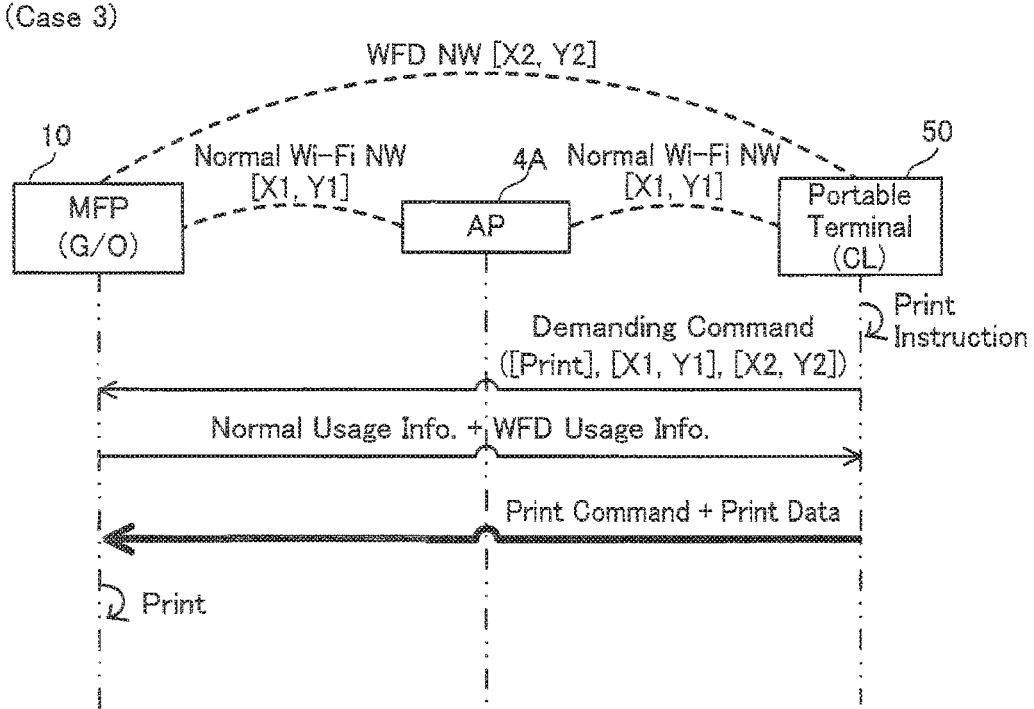
FIG. 12 shows a sequence diagram of case 3.

(Case 3; FIG. 12)

In case 3, the MFP 10 and the portable terminal 50 have the same state as case 1-1 (i.e., the specific situation). Upon receiving the demanding command from the portable terminal 50 (YES in S50 of FIG. 11), the MFP 10 determines that the MFP 10 and the portable terminal 50 belong to the same normal Wi-Fi NW and the same WFD NW (YES in S90). Consequently, the MFP 10 sends the normal usage information and the WFD usage information to the portable terminal 50 by using an NFC communication (S92).

Upon receiving the normal usage information and the WFD usage information from the MFP 10 (NO in S12, NO in S16 of FIG. 3), the portable terminal 50 selects e.g., the WFD NW (MFP, terminal) randomly, and sends the print command and the print data to the MFP 10 not via another device by using the WFD NW (MFP, terminal) (S28). Moreover, in a variant, the portable terminal 50 may select e.g., the normal Wi-Fi NW (MFP, terminal) randomly, and send the print command and the print data to the MFP 10 via the AP 4A by using the normal Wi-Fi NW (MFP, terminal).

According to case 3, in the specific situation, the MFP 10 can appropriately select both the normal Wi-Fi NW (MFP, terminal) and the WFD NW (MFP, terminal). Consequently, the MFP 10 and the portable terminal 50 can appropriately execute a wireless communication for the target data by using either of the normal Wi-Fi NW (MFP, terminal) and the WFD NW (MFP, terminal).

Figure 13:
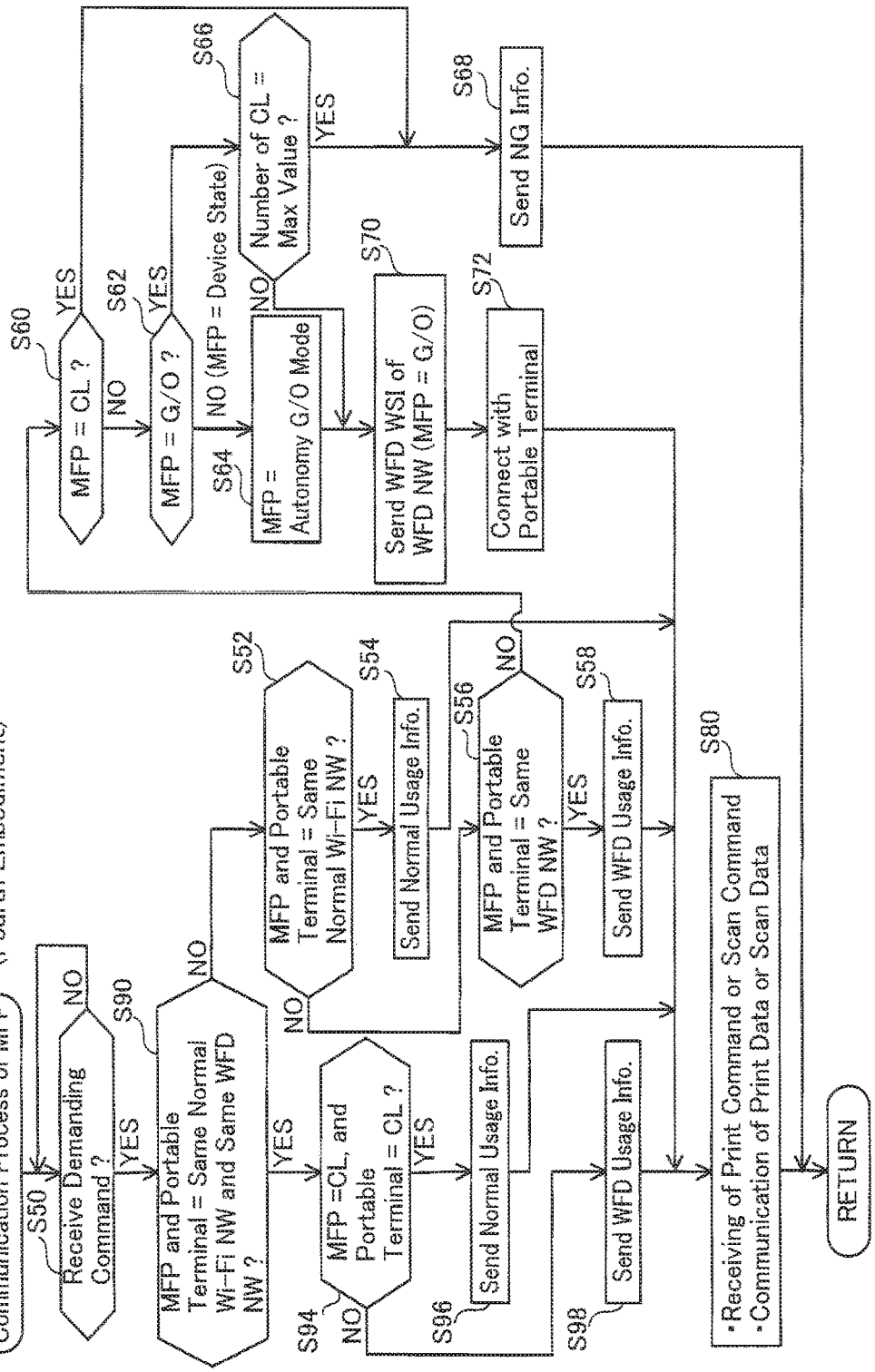
FIG. 13 shows a flowchart of a communication process of the MFP of a fourth embodiment.

Fourth Embodiment; FIG. 13

Points differing from the third embodiment will be described. In the present embodiment, in case the portable terminal 50 belongs to the WFD NW (terminal), in S10 of FIG. 3 the identification information sending unit 86 sends a demanding command further including state information indicating a current state (i.e., G/O state or CL state) of the portable terminal 50 to the MFP 10.

The controller 30 of the MFP 10 executes a flowchart of FIG. 13 instead of the flowchart of FIG. 11. In S50 of FIG. 13, the identification information receiving unit 41 of the MFP 10 may receive the demanding command including the state information from the portable terminal 50. In case the selection unit 42 determines YES in S90, the process proceeds to S94.

In S94, a state judgment unit 42A judges whether or not both the MFP 10 and the portable terminal 50 are in the CL state. In case the WFD state information in the memory 34 indicates CL state, and the state information in the demanding command indicates CL state, the state judgment unit 42A judges that both the MFP 10 and the portable terminal 50 are in the CL state (YES in S94), and the process proceeds to S96. In S96, the usage information sending unit 44 sends the normal usage information to the portable terminal 50 via the NFC I/F 22. That is, in case of YES in S94, the selection unit 42 selects only the normal Wi-Fi NW.

On the other hand, in case the WFD state information in the memory 34 indicates G/O state, or the state information in the demanding command indicates G/O state, the state judgment unit 42A judges that at least one of the MFP 10 and the portable terminal 50 is not in the CL state (NO in S94), and the process proceeds to S98. In S98, the usage information sending unit 44 sends the WFD usage information to the portable terminal 50 via the NFC I/F 22. That is, in case of NO in S94, the selection unit 42 selects only the WFD NW.

(Case 4-1; FIG. 14)

In case 4-1, the MFP 10 and the portable terminal 50 belong to the same WFD NW (SSID and BSSID="X3, Y3") in which the PC 6A is a G/O apparatus. That is, both the MFP 10 and the portable terminal 50 are in the CL state. The MFP 10 and the portable terminal 50, further, belong to the normal Wi-Fi NW. Consequently, case 4-1 is also the specific situation.

The demanding command includes state information indicating that the portable terminal 50 is in the CL state. Upon receiving the demanding command from the portable terminal 50 (YES in S50 of FIG. 13), the MFP 10 determines that the MFP 10 and the portable terminal 50 belong to the same normal Wi-Fi NW and the same WFD NW (YES in S90). Next, the MFP 10 determines that both the MFP 10 and the portable terminal 50 are in the CL state (YES in S94). Consequently, the MFP 10 sends the normal usage information to the portable terminal 50 by using an NFC communication (S96).

In the situation of case 4-1, it is possible that a power source of the PC 6A, which is the G/O apparatus, is turned OFF before a wireless communication of the print command and the print data is executed. In this case, because the WFD NW (MFP, terminal) is dissolved, the MFP 10 and the portable terminal 50 cannot execute a wireless communication for the target data by using the WFD NW (MFP, terminal). Consequently, in the situation of case 4-1, if a configuration were adopted in which the MFP 10 selects the WFD NW (MFP, terminal), the MFP 10 and the portable terminal 50 might be unable to execute a wireless communication for the target data. In view of these circumstances, in the present embodiment, a configuration is adopted in which, in case both the MFP 10 and the portable terminal 50 are in the CL state, the MFP 10 selects the normal Wi-Fi NW (MFP, terminal) (S96 of FIG. 13). Thereby, the MFP 10 and the portable terminal 50 can appropriately execute a wireless communication for the target data by using the normal Wi-Fi NW (MFP, terminal).

(Case 4-2; FIG. 14)

In case 4-2, the MFP 10 and the portable terminal 50 have the same state as case 1-1 (i.e., the specific situation). That is, the MFP 10 is in the G/O state. Consequently, the MFP 10 determines that at least one of the MFP 10 and the portable terminal 50 is not in the CL state (NO in S94), and sends the WFD usage information to the portable terminal 50 by using an NFC communication (S98).

In the situation of case 4-2, it is unlikely that the power source of the MFP 10, which is the G/O apparatus, is turned OFF before a wireless communication of the print command and the print data is executed. This is because the user does not usually turn OFF the power source of the MFP 10 due to knowing that a wireless communication of the print data is to be executed between the MFP 10 and the portable terminal 50. Consequently, in the present embodiment, a configuration is adopted in which, in case at least one of the MFP 10 and the portable terminal 50 is not in the CL state, i.e., in case one of the MFP 10 and the portable terminal 50 is in the G/O state, the MFP 10 selects the WFD NW (MFP, terminal) (S98 of FIG. 13). Thereby, even in case the privacy separator function of the AP 4A is enabled, the MFP 10 and the portable terminal 50 can appropriately execute a wireless communication for the target data by using the WFD NW (MFP, terminal).

Fifth Embodiment

Points differing from the first embodiment will be described. In the first embodiment, the selection unit 42 of the MFP 10 selects the wireless network to be used in a wireless communication for the target data (see S52, S56 of FIG. 4). By contrast, in the present embodiment, the portable terminal 50 selects the wireless network.

Figure 15:
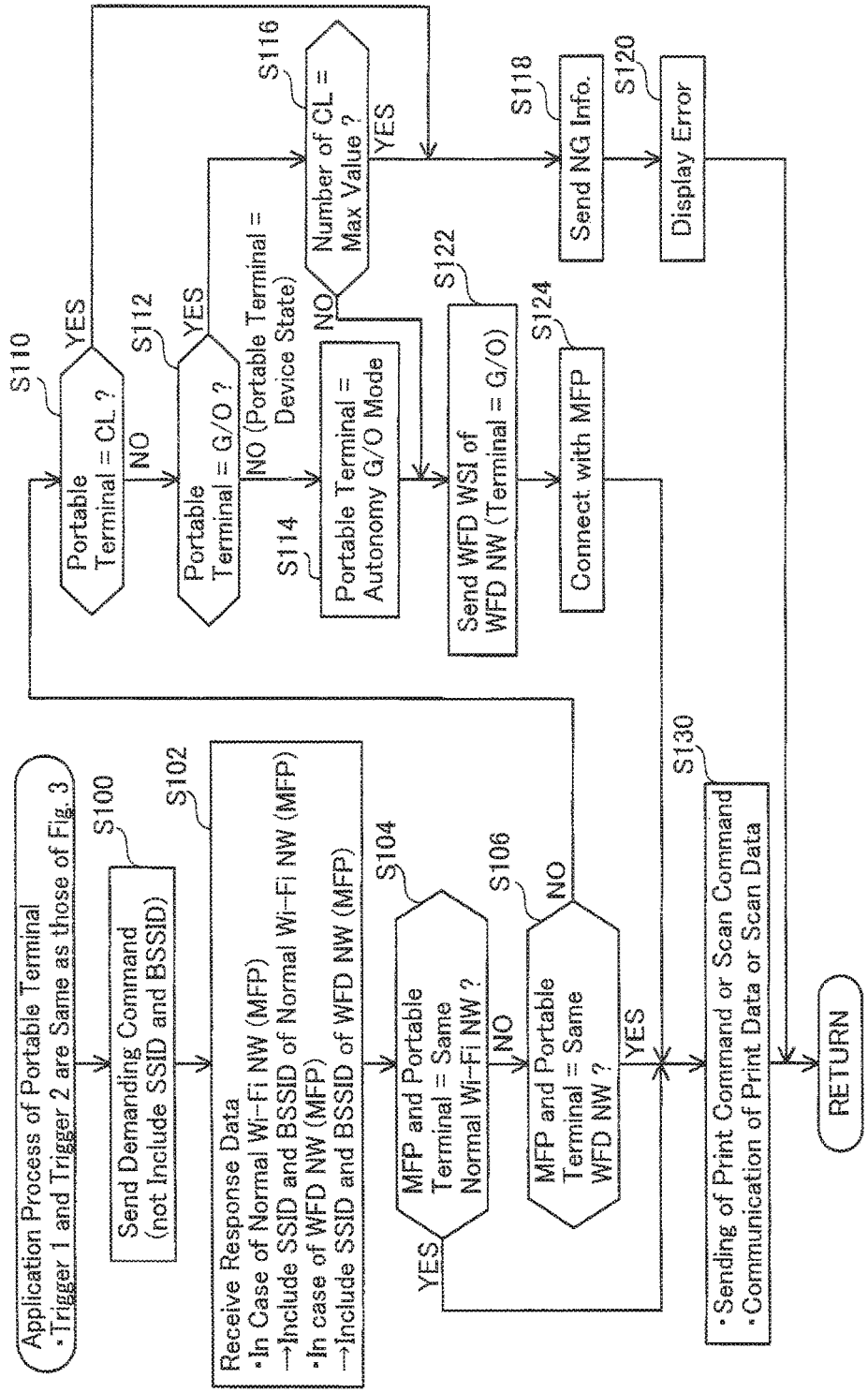
FIG. 15 shows a flowchart of an application process of the portable terminal of the fifth embodiment.

(Application Process of Portable Terminal 50; FIG. 15)

In the present embodiment, the controller 70 of the portable terminal 50 executes a flowchart of FIG. 15 instead of the flowchart of FIG. 3. In S100, the controller 70 sends the demanding command to the MFP 10 via the NFC I/F 62. The demanding command does not include the SSID and the BSSID even in case the portable terminal 50 belongs to at least one of the normal Wi-Fi NW (terminal) and the WFD NW (terminal).

In S102, an identification information receiving unit 81 receives response data from the MFP 10 via the NFC I/F 62. In case the MFP 10 belongs to the normal Wi-Fi NW (MFP), the response data includes the SSID and the BSSID of the normal Wi-Fi NW (MFP). Further, in case the MFP 10 belongs to the WFD NW (MFP), the response data includes the SSID and the BSSID of the WFD NW (MFP).

In S104, a selection unit 82 determines whether or not the MFP 10 and the portable terminal 50 belong to the same normal Wi-Fi NW (MFP, terminal). A determination method of S104 is the same as S52 of FIG. 4, with the exception that the information in the memory 74, and the information in the response data received from the MFP 10 is used. In case the selection unit 82 determines that the MFP 10 and the portable terminal 50 belong to the same normal Wi-Fi NW (MFP, terminal) (YES in S104), the process proceeds to S130. Thereby, the selection unit 82 selects only the normal Wi-Fi NW (MFP, terminal). On the other hand, in case of determining that the MFP 10 and the portable terminal 50 do not belong to the same normal Wi-Fi NW (MFP, terminal) (NO in S104), the selection unit 82 proceeds to S106.

In S106, the selection unit 82 determines whether or not the MFP 10 and the portable terminal 50 belong to the same WFD NW (MFP, terminal). A determination method of S106 is the same as S56 of FIG. 4, with the exception that the information in the memory 74, and the information in the response data received from the MFP 10 is used. In case of determining that the MFP 10 and the portable terminal 50 belong to the same WFD NW (MFP, terminal) (YES in S106), the selection unit 82 proceeds to S130. Thereby, the selection unit 82 selects only the WFD NW (MFP, terminal). On the other hand, in case the selection unit 82 determines that the MFP 10 and the portable terminal 50 do not belong to the same WFD NW (MFP, terminal) (NO in S106), the process proceeds to S110.

Below, processes from S110 onwards are described simply. However, contents of S110 to S118 can be understood in detail by referring to S60 to S68 of FIG. 4. In S110, the controller 70 determines whether or not a current state of the portable terminal 50 is CL state. In S112, the controller 70 determines whether or not a current state of the portable terminal 50 is G/O state. In S116, the controller 70 determines whether or not a number of CL apparatuses belonging to the WFD NW (terminal=G/O) is identical to the predetermined maximum value.

In case of YES in S110, in S118 the controller 70 sends the NG information to the MFP 10 via the NFC I/F 62. Next, in S120 the controller 70 causes the error screen to be displayed on the displaying unit 54. When S120 ends, the process of FIG. 15 ends.

In case of NO in S112, in S114 the controller 70 shifts the portable terminal 50 to the autonomy G/O mode. When S114 ends, in S122 a setting information sending unit 85 sends the WFD WSI in the memory 74 to the MFP 10 via the NFC I/F 22. Next, in S124 the controller 70 establishes a connection with the MFP 10. Thereby, the MFP 10 can participate in the WFD NW (terminal=G/O). When S124 ends, the process proceeds to S130.

In S130, the communication execution unit 83 executes the processes below. For example, in case of YES in S104, the communication execution unit 83 executes a wireless communication for the target data with the MFP 10 by using the normal Wi-Fi NW (MFP, terminal). Further, e.g., in case of YES in S106, the communication execution unit 83 executes a wireless communication for the target data with the MFP 10 by using the WFD NW (MFP, terminal). Further, e.g., in case S124 was executed, the communication execution unit 83 executes a wireless communication for the target data with the MFP 10 by using the WFD NW (terminal=G/O). When S130 ends, the process of FIG. 15 ends.

Moreover, in the present embodiment, the normal usage information and the WFD usage information are not sent from the portable terminal 50 to the MFP 10. This is because, if the portable terminal 50 sends the print command or the scan command to the MFP 10 by using the normal Wi-Fi NW (MFP, terminal) or the WFD NW (MFP, terminal), the MFP 10 can know which wireless network should be used to execute a wireless communication of the print data or the scan data.

Figure 16:
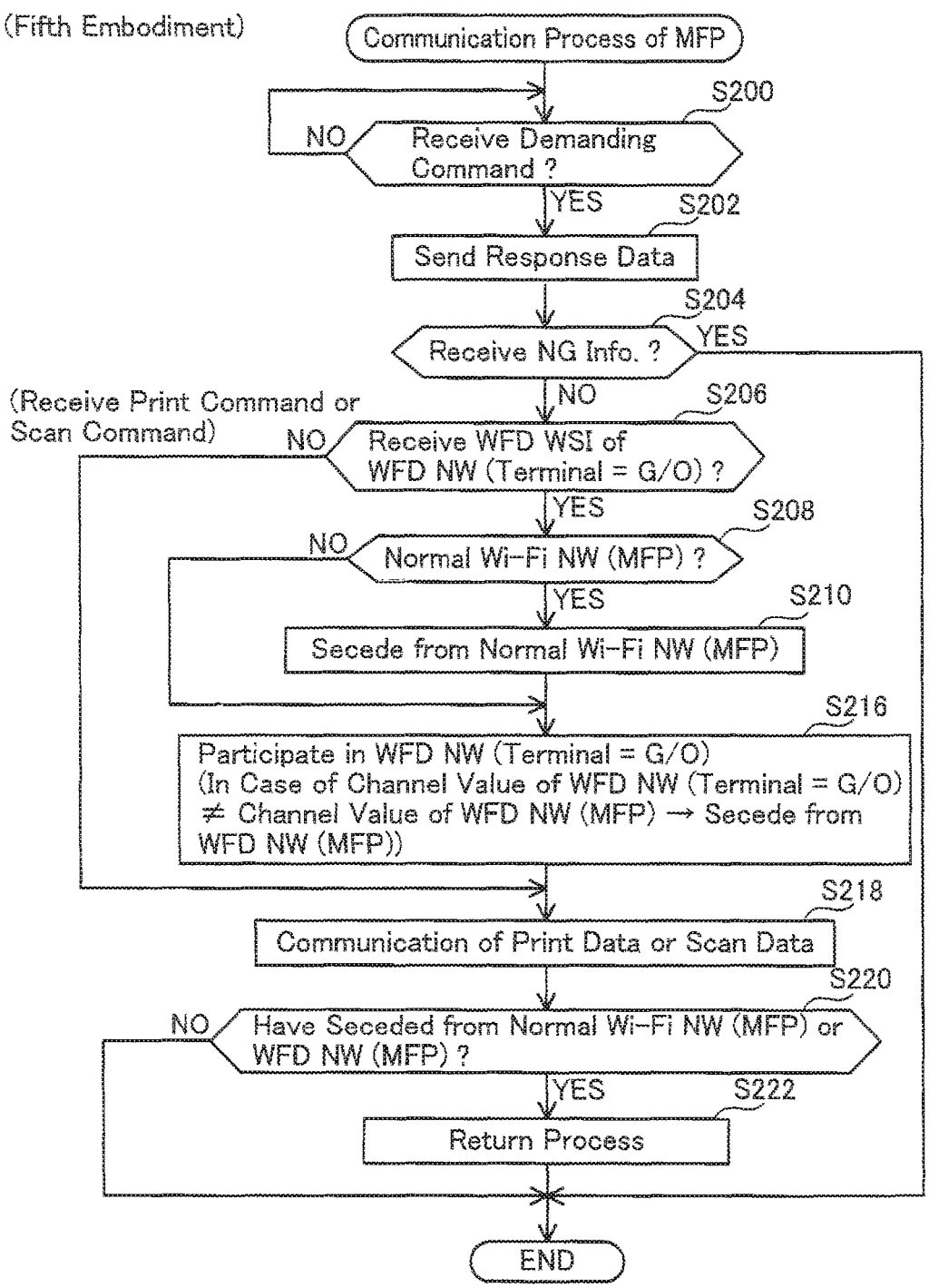
FIG. 16 shows a flowchart of a communication process of the MFP of the fifth embodiment.

(Communication Process of MFP 10; FIG. 16)

In the present embodiment, the controller 30 of the MFP 10 executes a flowchart of FIG. 16 instead of the flowchart of FIG. 4. In case of receiving a demanding command from the portable terminal 50 via the NFC I/F 22, the controller 30 determines YES in S200, and the process proceeds to S202. In S202, an identification information sending unit 46 sends response data to the portable terminal 50 via the NFC I/F 22. As described above, the response data includes the SSID and the BSSID of the wireless network to which the MFP 10 belongs.

Below, processes from S204 onwards are described simply. However, contents of S204 to S222 can be understood in detail by referring to S12 to S32 of FIG. 3. In case of receiving the NG information from the portable terminal 50 via the NFC I/F 22 (see S118 of FIG. 15), the controller 30 determines YES in S204, and ends the process of FIG. 16. Further, in case of receiving the WFD WSI from the portable terminal 50 via the NFC I/F 22 (see S122 of FIG. 15), a setting information receiving unit 47 determines YES in S206, and the process proceeds to S208.

In S208, a seceding control unit 48 determines whether or not the MFP 10 currently belongs to the normal Wi-Fi NW. In case of determining that the portable terminal 50 currently belongs to the normal Wi-Fi NW (YES in S208), the seceding control unit 48 proceeds to S210. In S210, the seceding control unit 48 causes the MFP 10 to secede from the normal Wi-Fi NW (MFP).

In S216, by using the normal Wi-Fi MAC, a participating control unit 49 participates in the WFD NW (terminal=G/O) as a normal Wi-Fi apparatus. Moreover, the participating control unit 49 does not cause the MFP 10 to secede from the WFD NW (MFP) in case a channel value being used in the WFD NW (terminal=G/O) and a channel value being used in the WFD NW (MFP) are identical, but does secede the MFP 10 from the WFD NW (MFP) in case the values of the two channels are not identical. When S216 ends, the process proceeds to S218.

Further, in case of receiving the print command or the scan command from the portable terminal 50 via the wireless LAN I/F 20 (see S130 of FIG. 15), the controller 30 determines NO in S206, and the process proceeds to S218. In S218, the communication execution unit 43 executes a wireless communication of the print data or the scan data with the portable terminal 50 via the wireless LAN I/F 20 by using the wireless network in which the print command or the scan command was received.

In case the MFP 10 has seceded from at least one of the normal Wi-Fi NW (MFP) and the WFD NW (MFP), the controller 30 determines YES in S220, and proceeds to S222. In S222, the controller 30 attempts to cause the MFP 10 to re-participate in the wireless network from which the MFP 10 seceded. When S222 ends, the process of FIG. 16 ends.

(Case 5-1; FIG. 17)

In case 5-1, the MFP 10 and the portable terminal 50 have the same state as case 1-1 of FIG. 5 (i.e., the specific situation). Upon receiving the demanding command from the portable terminal 50 by using an NFC communication (YES in S200 of FIG. 16), the MFP 10 sends response data including the two sets of SSID and BSSID "X1, Y1", "X2, Y2" to the portable terminal 50.

The portable terminal 50 determines that the MFP 10 and the portable terminal 50 belong to the same normal Wi-Fi NW (MFP, terminal) (YES in S104 of FIG. 15). Consequently, the portable terminal 50 sends the print command and the print data to the MFP 10 via the AP 4A by using the normal Wi-Fi NW (MFP, terminal) (S130).

According to case 5-1, in the specific situation, the portable terminal 50 can appropriately select only the normal Wi-Fi NW (MFP, terminal). Consequently, the MFP 10 and the portable terminal 50 can appropriately execute a wireless communication for the target data by using the normal Wi-Fi NW (MFP, terminal).

(Case 5-2; FIG. 17)

In case 5-2, the MFP 10 and the portable terminal 50 belong to the same WFD NW (MFP, terminal). Further, the portable terminal 50 belongs to the normal Wi-Fi NW (terminal), whereas the MFP 10 does not belong to the normal Wi-Fi NW. Upon receiving the demanding command from the portable terminal 50 (YES in S200 of FIG. 16), the MFP 10 sends response data including the one set of SSID and BSSID "X2, Y2" to the portable terminal 50 by using an NFC communication.

The portable terminal 50 determines that the MFP 10 and the portable terminal 50 do not belong to the same normal Wi-Fi NW (NO in S104 of FIG. 15), and then determines that the MFP 10 and the portable terminal 50 belong to the same WFD NW (MFP, terminal) (YES in S106). Consequently, the portable terminal 50 sends the print command and the print data to the MFP 10 not via another device by using the WFD NW (MFP, terminal) (S130).

According to case 5-2, in case the MFP 10 and the portable terminal 50 do not belong to the same normal Wi-Fi NW but belong to the same WFD NW, the portable terminal 50 can appropriately select only the WFD NW (MFP, terminal). Consequently, the MFP 10 and the portable terminal 50 can appropriately execute a wireless communication for the target data by using the WFD NW (MFP, terminal). Moreover, in the present embodiment, the MFP 10 and the portable terminal 50 are respectively examples of the "second communication apparatus" and the "first communication apparatus".

(Variant 1)

In the fifth embodiment, the selection unit 82 of the portable terminal 50 executes the process of S104 of FIG. 15 before the process of S106. That is, as in the first embodiment, a configuration is also adopted in the fifth embodiment in which only the normal Wi-Fi NW (MFP, terminal) is selected in the specific situation. Instead, the selection unit 82 may execute the process of S106 of FIG. 15 before the process of S104. That is, in the specific situation, the selection unit 82 may select only the WFD NW (MFP, terminal). In the present variant, the same results as in the second embodiment can be obtained. Further, the selection unit 82 may comprise a state judgment unit 82A. In this case, as with S94 of FIG. 13 of the fourth embodiment, in the specific situation, the state judgment unit 82A judges whether both the MFP 10 and the portable terminal 50 are in the CL state, and may select only the normal Wi-Fi NW (MFP, terminal) in case both the MFP 10 and the portable terminal 50 are in the CL state, or may select only the WFD NW (MFP, terminal) in case at least one of the MFP 10 and the portable terminal 50 is not in the CL state. In the present variant, the same results as in the fourth embodiment can be obtained.

(Variant 2)

In the first to fifth embodiments, the selection units 42, 82 execute both the determination of whether SSIDs are identical and the determination of whether BSSIDs are identical. Instead, the selection units 42, 82 may execute only the determination of whether SSIDs are identical. For example, in the first to fourth embodiments, the demanding command need not include the BSSID. In this case, in case an SSID identical to the SSID of the normal Wi-Fi NW (MFP) in the memory 34 is included in the demanding command, in S52 of FIG. 4 the selection unit 42 may determine that the MFP 10 and the portable terminal 50 belong to the same normal Wi-Fi NW (YES in S52). Further, in case an SSID identical to the SSID of the WFD NW (MFP) in the memory 34 is included in the demanding command, in S56 of FIG. 4 the selection unit 42 may determine that the MFP 10 and the portable terminal 50 belong to the same WFD NW (YES in S56).

Further, in e.g., the first to fourth embodiments, the demanding command need not include an SSID. In this case, in case a BSSID identical to the BSSID of the normal Wi-Fi NW (MFP) in the memory 34 is included in the demanding command, in S52 of FIG. 4 the selection unit 42 may determine that the MFP 10 and the portable terminal 50 belong to the same normal Wi-Fi NW (YES in S52). Further, in case a BSSID identical to the BSSID of the WFD NW (MFP) in the memory 34 is included in the demanding command, in S56 of FIG. 4 the selection unit 42 may determine that the MFP 10 and the portable terminal 50 belong to the same WFD NW (YES in S56).

In the present variant, also, the selection units 42, 82 can appropriately select a wireless network to which both the MFP 10 and the portable terminal 50 belong. In general terms, the selection unit may select at least one wireless network by using at least one of the SSID and the BSSID.

(Variant 3)

The "first wireless network" is not restricted to the WFD NW, but may be a normal Wi-Fi NW formed by an AP, may be a normal Wi-Fi NW formed by an apparatus (e.g., the PC 6A) functioning as a so-called Soft AP, or may be an ad hoc wireless network. Further, e.g., the "second wireless network" is not restricted to the normal Wi-Fi NW formed by an AP, but may be a normal Wi-Fi NW formed by an apparatus (e.g., the PC 6A) functioning as a so-called Soft AP, may be an ad hoc wireless network, or may be a WFD NW. Further, the "first and second wireless networks" may be the same type of wireless network. For example, the "first wireless network" may be a first normal Wi-Fi NW, and the "second wireless network" may be a second normal Wi-Fi NW.

(Variant 4)

The "first type of interface" is not restricted to an interface for executing an NFC communication, but may be an interface for executing an infrared communication, may be an interface for executing Bluetooth (registered trademark), or may be an interface for executing Transfer Jet. For example, a communication speed of a wireless communication via the second type of interface may be faster than a communication speed of a wireless communication via the first type of interface.

(Variant 5)

The "first type and the second type of interface" may be two interfaces (e.g., two IC chips) configured separately, as in the above embodiments, or may be one interface (e.g., one IC chip) configured integrally. Further, in the above embodiments, the "second type of interface" is one interface (i.e., the wireless LAN I/F 20 or the wireless LAN I/F 60). Instead, the "second type of interface" may be configured by, e.g., a first interface (i.e., one IC chip) for executing a normal Wi-Fi communication, and a second interface (i.e., one IC chip) for executing a WFD communication and that is configured separately from the first interface.

(Variant 6)

The "communication apparatus" is not restricted to the MFP 10 or the portable terminal 50, but may be another communication apparatus (e.g., printer, scanner, FAX device, copier, telephone, desktop PC, server, etc.).

(Variant 7)

In the above embodiments, the functions of the units 41 to 49, 81 to 89 are realized by the CPUs 32, 72 of the MFP 10 and the portable terminal 50 executing programs (i.e., software) in the memories 34, 74. Instead, at least one of the units 41 to 49, 81 to 89 may be realized by hardware such as a logic circuit, etc.

What is claimed is:

1. A non-transitory computer-readable medium storing computer-readable instructions for a first communication apparatus, when executed by a controller of the first communication apparatus, causing the first communication apparatus to perform:
receiving first information for identifying a first wireless network and second information for determining whether the first communication apparatus belongs to a second wireless network via a first type of interface of the first communication apparatus from a second communication apparatus, the first wireless network being for executing a communication not via an access point different from both the first communication apparatus and the second communication apparatus, the second wireless network being for executing a communication via the access point, the first wireless network being for executing a communication via an interface of which communication speed is faster than a communication speed of the first type of interface, the second wireless network being for executing a communication via an interface of which communication speed is faster than the communication speed of the first type of interface;
determining, based on the second information, whether the first communication apparatus belongs to the second wireless network in a case where the first information and the second information are received;
executing a wireless communication of target data with the second communication apparatus by using the second wireless network in a case where it is determined that the first communication apparatus belongs to the second wireless network, even if the first information indicates that the first communication apparatus and the second communication apparatus belong to the first wireless network; and
executing the wireless communication of the target data with the second communication apparatus by using the first wireless network identified by the first information received with the second information in a case where it is determined that the first communication apparatus does not belong to the second wireless network.

2. The non-transitory computer-readable medium as in claim 1, wherein
the first information includes at least one of an SSID of a wireless network being for executing a communication not via the access point and a BSSID of the wireless network being for executing a communication not via the access point; and
the second information includes at least one of an SSID of a wireless network being for executing a communication via the access point and an BSSID of the wireless network being for executing a communication via the access point.

3. The non-transitory computer-readable medium as in claim 1, wherein
the second wireless network and the first wireless network are for executing a communication via same interface.

4. The non-transitory computer-readable medium as in claim 1, wherein
the first type of interface is for executing an NFC (an abbreviation of Near Field Communication) communication.

5. The non-transitory computer-readable medium as in claim 1, wherein the second communication apparatus is a portable terminal.

6. The non-transitory computer-readable medium as in claim 1, wherein
the first information and the second information are received with function information via the first type of interface from the second communication apparatus, the function information indicating a function to be executed by an image processing device which is the first communication apparatus.

7. A first communication apparatus comprising:
a first type of interface;
a processor; and
a memory storing computer-readable instructions therein, the computer-readable instructions, when executed by the processor, causing the first communication apparatus to perform:
receiving first information for identifying a first wireless network and second information for determining whether the first communication apparatus belongs to a second wireless network via the first type of interface from a second communication apparatus, the first wireless network being for executing a communication not via an access point different from both the first communication apparatus and the second communication apparatus, the second wireless network being for executing a communication via the access point, the first wireless network being for executing a communication via an interface of which communication speed is faster than a communication speed of the first type of interface, the second wireless network being for executing a communication via an interface of which communication speed is faster than the communication speed of the first type of interface;
determining, based on the second information, whether the first communication apparatus belongs to the second wireless network in a case where the first information and the second information are received;
executing a wireless communication of target data with the second communication apparatus by using the second wireless network in a case where it is determined that the first communication apparatus belongs to the second wireless network, even if the first information indicates that the first communication apparatus and the second communication apparatus belong to the first wireless network; and
executing the wireless communication of the target data with the second communication apparatus by using the first wireless network identified by the first information received with the second information in a case where it is determined that the first communication apparatus does not belong to the second wireless network.

8. The first communication apparatus as in claim 7, wherein
the first information includes at least one of an SSID of a wireless network being for executing a communication not via the access point and a BSSID of the wireless network being for executing a communication not via the access point; and
the second information includes at least one of an SSID of a wireless network being for executing a communication via the access point and an BSSID of the wireless network being for executing a communication via the access point.

9. The first communication apparatus as in claim 7, wherein the second wireless network and the first wireless network are for executing a communication via same interface.

10. The first communication apparatus as in claim 7, wherein
the first type of interface is for executing an NFC (an abbreviation of Near Field Communication) communication.

11. The first communication apparatus as in claim 7, wherein
the second communication apparatus is a portable terminal.

12. The first communication apparatus as in claim 7, wherein
the first information and the second information are received with function information via the first type of interface from the second communication apparatus, the function information indicating a function to be executed by an image processing device which is the first communication apparatus.

13. A non-transitory computer-readable medium storing computer-readable instructions for a second communication apparatus, when executed by a controller of the second communication apparatus, causing the second communication apparatus to perform:
sending first information for identifying a first wireless network and second information for determining whether a first communication apparatus belongs to a second wireless network via a first type of interface of the second communication apparatus to the first communication apparatus, the first wireless network being for executing a communication not via an access point different from both the first communication apparatus and the second communication apparatus, the second wireless network being for executing a communication via the access point, the first wireless network being for executing a communication via an interface of which a communication speed is faster than a communication speed of the first type of interface, the second wireless network being for executing a communication via an interface of which a communication speed is faster than a communication speed of the first type of interface;
executing a wireless communication of target data with the first communication apparatus by using the second wireless network in a case where the first communication apparatus determines, based on the second information, that the first communication apparatus belongs to the second wireless network, even if the first information indicates that the first communication apparatus and the second communication apparatus belong to the first wireless network; and
executing the wireless communication of the target data with the first communication apparatus by using the first wireless network identified by the first information sent to the first information in a case where the first communication apparatus determines, based on the second information, that the first communication apparatus does not belong to the second wireless network.

14. The non-transitory computer-readable medium as in claim 13, wherein
the first information includes at least one of an SSID of a wireless network being for executing a communication not via the access point and a BSSID of the wireless network being for executing a communication not via the access point; and
the second information includes at least one of an SSID of a wireless network being for executing a communication via the access point and an BSSID of the wireless network being for executing a communication via the access point.

15. The non-transitory computer-readable medium as in claim 13, wherein
the second wireless network and the first wireless network are for executing a communication via same interface.

16. The non-transitory computer-readable medium as in claim 13, wherein
the first type of interface is for executing an NFC (an abbreviation of Near Field Communication) communication.

17. The non-transitory computer-readable medium as in claim 13, wherein
the second communication apparatus is a portable terminal.

18. The non-transitory computer-readable medium as in claim 13, wherein
the computer-readable instructions, when executed by the controller of the second communication apparatus, further cause the second communication apparatus to perform:
sending function information together with the first information and the second information via the first type of interface to the first communication apparatus, the function information indicating a function to be executed by an image processing device which is the first communication apparatus.

* * * * *